US008045856B2

(12) United States Patent
Shen et al.

(10) Patent No.: US 8,045,856 B2
(45) Date of Patent: Oct. 25, 2011

(54) POLARIZATION MODE DISPERSION COMPENSATION AND POLARIZATION DEMULTIPLEXING SYSTEMS AND METHODS FOR OPTICAL TRANSMISSION SYSTEMS

(75) Inventors: Yunfeng Shen, Bethesda, MD (US); Shan Zhong, Ellicott City, MD (US); Harshad Sardesai, Ellicott City, MD (US)

(73) Assignee: Ciena Corporation, Linthicum, MD (US)

( * ) Notice: Subject to any disclaimer, the term of this patent is extended or adjusted under 35 U.S.C. 154(b) by 568 days.

(21) Appl. No.: 12/263,301

(22) Filed: Oct. 31, 2008

(65) Prior Publication Data

US 2010/0111530 A1 May 6, 2010

(51) Int. Cl.
 *H04J 14/06* (2006.01)
(52) U.S. Cl. ............. 398/65; 398/29; 398/81; 398/147; 398/152; 398/158; 398/159; 398/208
(58) Field of Classification Search ............ 398/29, 398/65, 81, 147, 152, 158, 159, 208
See application file for complete search history.

(56) References Cited

U.S. PATENT DOCUMENTS

| 5,473,457 | A | * | 12/1995 | Ono ............................. 398/185 |
| 5,659,412 | A | * | 8/1997 | Hakki ........................... 398/152 |
| 5,930,414 | A | * | 7/1999 | Fishman et al. ................ 385/11 |
| 6,104,515 | A | * | 8/2000 | Cao ............................. 398/147 |
| 6,782,211 | B1 | * | 8/2004 | Core ............................ 398/205 |
| 6,865,305 | B2 | * | 3/2005 | Rasmussen et al. ............ 385/11 |
| 7,613,366 | B2 | * | 11/2009 | Rasmussen et al. ............ 385/2 |
| 2005/0175339 | A1 | * | 8/2005 | Herskowits et al. ............ 398/1 |
| 2005/0201758 | A1 | * | 9/2005 | Isomura et al. ............... 398/158 |
| 2005/0265728 | A1 | * | 12/2005 | Yao ............................. 398/152 |
| 2008/0101799 | A1 | * | 5/2008 | Raddatz et al. ............... 398/147 |
| 2008/0292321 | A1 | * | 11/2008 | Ciaramella et al. ........... 398/152 |
| 2009/0103921 | A1 | * | 4/2009 | Frankel ........................ 398/65 |

OTHER PUBLICATIONS

D. Van Den Borne, S. L. Jansen, E. Gottwald, P.M. Krummrich, G. D. Khoe, H. De Waardt; "1.6-b/s/Hz Spectrally Efficient Transmission Over 1700 km of SSMF Using 40×85.6-Gb/s POLMUX-RZ-DQPSK"; Journal of Lightwave Technology, Vo. 25, No. 1, Jan. 2007.
E. Ciaramella and E. Matarazzo; "Stabilizing PMD Compensators by Means of Polarization Dithering"; IEEE Photonics Technology Letters, vol. 19, No. 23, Dec. 1, 2007.

(Continued)

*Primary Examiner* — Li Liu
(74) *Attorney, Agent, or Firm* — Clements Bernard PLLC; Christopher L. Bernard; Lawrence A. Baratta, Jr.

(57) ABSTRACT

The present disclosure provides polarization mode dispersion compensation (PMDC) and polarization de-multiplexing systems and methods for polarization multiplexed (PolMux) optical transmission systems. The PMDC detects an error signal before a polarization splitter in PolMux systems for controlling polarization controllers (PC) and/or DGDs in the PMDC for return-to-zero (RZ) differential m-phase shift keying (DmPSK) signals. For bit-aligned PolMux systems, the error signal could be the level of clock frequency at one, two, or more times of the baud rate at one polarization. For bit-interleaved PolMux systems, the error signal could be the level of clock frequency at two times of the baud rate at one polarization. The PMDC can operate in PolMux systems with any arbitrary time offset between the two polarizations. The polarization de-multiplexer utilizes error detection at both output arms of a polarization splitter to mitigate PDL impact on any PolMux type of signal.

16 Claims, 22 Drawing Sheets

OTHER PUBLICATIONS

Ernesto Ciaramella; "Theoretical Evidence of Dynamical Limitations in Practical Single-Stage PMD Compensators"; IEEE Photonics Technology Letters, vol. 16, No. 8, Aug. 2004.

Hok Yong Pua, Kumar Peddanarappagari, Benyuan Zhu, Christopher Allen, Kenenth Demarest, and Rongqing Hui; An Adaptive First-Order Polarization-Mode Dispersion Compensation System Aided by Polarization Scrambling: Theory and Demonstration; Journal of Lightwave Technology, vol. 18, No. 6, Jun. 2000.

Hemonth Rao; A Novel Multi-Stage Automatic PMD Compensator for Polarization-Multiplexed Signals; 2007 Optical Society of America; IEEE.

David Sandel, Frank Wust, Vitali Mirvoda, and Reinhold Noe; Standard (NRZ 1×40 Gb/s, 210 km) and Polarization Multiplex (CS-RZ, 2×40 Gb/s, 212 km) Transmissions With PMD Compensation; IEEE Photonics Technology Letters, vol. 14, No. 8, Aug. 2002.

Henrick Sunnerud, Chongjin Xic, Magnus Karlsson, Robert Samuelsson, and Peter A. Andrekson; A Comparison Between Different PMD Compensation Techniques; Journal of Lightwave Technology, vol. 20, No. 3, Mar. 2002.

* cited by examiner

POLARIZATION MODE DISPERSION COMPENSATION AND POLARIZATION DEMULTIPLEXING SYSTEMS AND METHODS FOR OPTICAL TRANSMISSION SYSTEMS

FIELD OF THE INVENTION

The present invention relates generally to optical transmission systems. More particularly, the present invention provides polarization mode dispersion compensation (PMDC) and polarization de-multiplexing systems and methods for polarization multiplexed (PolMux) for optical transmission systems.

BACKGROUND OF THE INVENTION

The rapid advance of transmission capacity of optical fiber communication systems demands techniques to improve optical spectral efficiency. For example, advanced optical modulation formats have been proposed to increase spectral efficiency and transmission distance. Exemplary formats include return-to-zero (RZ) differential binary phase shift keying (DBPSK), differential quadrature phase shift keying (DQPSK), differential 8 phase shift keying (D8PSK), and the like (generically referred to as DmPSK). RZ refers to the fact that the optical intensity returns to zero within each bit slot. Generally, duty cycles for RZ signals include 33%, 50% and 67% of the symbol period. DBPSK encodes information on the binary phase change between adjacent bits: a 1-bit is encoded onto a $\pi$ phase change, whereas a 0-bit is represented by the absence of a phase change. The difference of an optical pulse train between DBPSK and the traditional on-off keying (OOK) is that DBPSK has an optical pulse in every bit while OOK has an optical pulse in 1-bits only. DBPSK has an advantage of 3 dB receiver sensitivity improvement over the OOK modulation format. DQPSK is a multi-level modulation formation that doubles the spectral efficiency at a symbol rate of half of the aggregate bit rate. It also has an optical pulse in every bit, which is coded by one of four phase shifts $\{0, \pi/2, \pi, -\pi/2\}$.

Polarization-multiplexing (PolMux) can further double the capacity of a wavelength channel and the spectral efficiency by transmitting two optical signals at orthogonal polarizations on the same wavelength. A polarization de-multiplexer is needed to track and split the two orthogonal polarizations in front of an optical receiver. If the bits of the two polarizations are synchronized or aligned with each other, it is called a bit-aligned PolMux system. On the other hand, if the bits of the two polarizations are offset by a half bit, it is called a bit-interleaved PolMux system. Also, the bits of the two polarizations can be offset by an arbitrary amount. PolMux-RZ-DBPSK or PolMux-RZ-DQPSK are very promising techniques for advanced optical fiber communication systems.

The birefringence of optical fiber supports two polarization modes, each having different propagation velocities, giving rise to polarization mode dispersion (PMD). Disadvantageously, PMD provides limiting effect for high speed optical communication systems, i.e. 10 Gbit/s and beyond. In a first order approximation, the PMD of fiber can be described by the parameters of differential group delay (DGD) and principal states of polarization (PSPs). An input optical pulse whose state of polarization (SOP) is aligned with one of the fiber's two input PSPs will come out of the fiber without distortion. An input pulse aligned with neither input PSP will emerge as two orthogonally polarized pulses, separated in time by the fiber's DGD. Both the DGD and the PSPs of the optical fiber vary randomly with time due to environmental factors and the like. Although polarization-multiplexing is considered promising for increasing the transmission capacity, it suffers from decreased PMD tolerance in comparison to non-polarization-multiplexing transmission. Accordingly, PMD compensation is a critical issue for PolMux systems.

Conventionally, many optical PMD compensators (PM-DCs) have been proposed to overcome PMD limitations. A single stage PMDC usually includes a polarization controller (PC) and a fixed or variable time delay. Two or more stages of a polarization controller and time delay can be cascaded to build a multi-stage PMDC. A control loop is set up to extract error signals in front of a receiver and the error signals control the polarization controller and/or time delay automatically. In polarization multiplexed systems, both the PMDC and the polarization de-multiplexer need to be controlled automatically. They may use the same error signal or different error signals based on system design.

An optical PMDC can work in one of two different operating modes: cancellation mode and PSP mode. The PMD of a fiber system can be described as a vector quantity, with the DGD as the magnitude and the fast axis of the PSP as the direction. The principle of a cancellation mode PMDC is to adjust the PMD vector of the PMDC to be of an opposite direction of the PMD vector of the fiber system so the magnitude of the combined PMDC vector is minimized. If the DGD of the PMDC is variable, the PMD of fiber system can be perfectly cancelled in the first order approximation. The principle of the PSP mode is to adjust the direction of the PMD vector of the PMDC to align the direction of combined PMD vector to the same or opposite direction as that of the signal input SOP. In this way, the signal is injected to the one of the PSPs of the fiber system and the PMDC, and comes out of the PMDC without distortion.

Most conventional optical PMDCs cannot differentiate between these two modes and may work in either of them (H. Sunnerud, et al., "A comparison between different PMD compensation techniques", OSA/IEEE JLT, vol. 20, no. 3, pp. 368-378, 2002). They have the problem of dynamic limitation (E. Ciaramella, "Theoretical evidence of dynamical limitations in practical single-stage PMD compensators", IEEE PTL, vol. 16, no. 8, pp. 1843-1845, 2004). Dynamic evolution of the signal input SOP and the fiber PSP could require a switch between these two modes, producing significant performance degradation during the switch. The fundamental reason for this problem is that both modes can compensate for the PMD, and the error signals generated in front of the receiver cannot differentiate between these two modes. To solve this problem, the PMDC has to be locked in the cancellation mode. So the error signal used for PMDC control has to be sensitive to the total DGD change and insensitive to the PSP change of the combined PMD vector of fiber system and PMDC.

H. Y. Pua et al. propose polarization scrambling at a transmitter to lock the PMDC at the cancellation mode (H. Y. Pua et al., "An adaptive first-order polarization-model dispersion compensation system aided by polarization scrambling: theory and demonstration", OSA/IEEE JLT, vol. 18, no. 6, pp. 832-841, 2000). However, this technique produces timing jitter and partial eye closure when some residual DGD remains. It is also not applicable to polarization multiplexed systems because fast polarization scrambling prevents polarization multiplexed systems from polarization tracking and de-multiplexing in front of the receiver.

E. Ciaramella et al propose low-depth polarization dithering to stabilize the PMDC at the cancellation mode in order to decrease the penalty of timing jitter and eye closure (E. Ciaramella and E. Matarazzo, "Stabilizing PMD compensators by means of polarization dithering", IEEE PTL, vol. 19, no. 23, pp. 1892-1894, 2007). However, polarization dithering produces crosstalk between the two orthogonal polarizations when they are de-multiplexed.

Polarization multiplexed systems include signals at two orthogonal polarizations. When PMD exists in a fiber system, the arrival time and relative delay of the two polarizations will depend on the DGD level and the angle difference between the SOPs of the signals and PSPs of the system. The information extracted between the two orthogonal polarizations may be used as error signals to control PMDC.

D. Sandel et al. propose the detection of arrival time of optical pulses at a polarization for control of the PMDC, and the detection of interference between two polarizations for control of the polarization de-multiplexer in polarization multiplexed signals (D. Sandel, et al., "Standard and polarization multiplex transmission with PMD compensation", IEEE PTL, vol. 14, no. 8, pp. 1181-1183, 2002). Both error signals are detected from the signal at one polarization after a polarization splitter. This technique was used for OOK systems, but not for DBPSK, DQPSK, or DmPSK systems. It also needs complex electrical circuits to detect the arrival time of optical pulses accurately.

Hemonth Rao proposed the detection of RF power at the frequency of baud rate before the polarization splitter for the control of both the PMDC and the polarization de-multiplexer in bit-interleaved polarization multiplexed signals (Hemonth Rao, "A novel multi-stage automatic PMD compensator for polarization-multiplexed signals", OFC, OThU1, 2008). It uses a polarization maintaining tap and a component with half-symbol period DGD to generate the demanded clock frequency. The detected error signal is used to control the polarization controllers for both the PMDC and the polarization de-multiplexer. However, these techniques are not optimal. The control objective is to minimize the DGD value and align the SOPs of the signals with that of the polarization splitter. The polarization state change caused by the polarization controller of the polarization de-multiplexer will change the SOPs of signals only. However, any polarization state change caused by the polarization controller of the PMDC will change both the DGD value and the SOPs of signals. The PMDC may be locked at a state with a bad DGD value and an optimal SOP state, because any optimize of DGD value will cause a penalty from a sub-optimal SOP state. If the penalty from the sub-optimal SOP state is higher than the gain from the better DGD value, the PMDC will not be moved to new state. Actually, the PMDC should move to the new state because the penalty caused by sub-optimal SOP state can be compensated by the state change of the polarization controller of the polarization de-multiplexer. Because two or more polarization controllers are controlled by a single error signal, some compromises may be needed in the control algorithm. This is probably the reason why the reported control speed is very low. Another issue of the PMDC in Rao is that it works for bit-interleaved polarization multiplexed signals only.

Additionally, PolMux systems require a polarization de-multiplexer in addition to PMDC. An automatic polarization de-multiplexer usually includes a polarization controller (also referred to as a polarization tracker, polarization stabilizer, etc.), a polarization splitter, an error detection circuit, and a control circuit. The polarization controller is used to align the state of polarization (SOP) of the input signals to the polarization splitter. The polarization splitter splits the input signals into two output arms: one at horizontal linear polarization and the other at vertical linear polarization. If the SOP of the input signals are aligned to horizontal and vertical linear polarizations, the polarization multiplexed input signals are perfectly de-multiplexed. If not, each output arm includes both signals, in which one is the desired signal at the desired polarization while the other is the crosstalk from the other polarization. The error detection circuit is located at the one output arm of the polarization splitter. It detects an error signal that reflects the amount of crosstalk in the output arms of the polarization splitter. The control circuit reads the error signal and controls the polarization controller to minimize the crosstalk.

In optical systems, the loss and gain of some optical components may vary as the signal SOP changes. These are referred to as polarization dependent loss (PDL) and polarization dependent gain (PDG). Because gain is the negative of loss, the term PDL can be used to represent both polarization dependent loss and polarization dependent gain with an appropriate sign (+/−). The polarization dependence of the transmission properties of optical components has many sources. Some of the common effects are fiber bending, angled optical interfaces, oblique reflection, and optical amplification.

PDL has a severe impact on PolMux systems. PDL can cause a power difference between the signals at the two orthogonal polarizations, and destroy the orthogonal relationship of the two signals. The two signals then are no longer at two perfect orthogonal polarizations. Because the two output arms of the polarization splitter are always at orthogonal polarizations, the two polarization-multiplexed signals can no longer be de-multiplexed perfectly. Because conventional polarization de-multiplexers only have error detection circuits at one output arm of the polarization splitter, they have no idea of the existence and level of PDL in the system. They can only always try to align the SOP of one signal, signal H, to one arm of the polarization splitter, say arm H, and assume that the SOP of the other signal, say signal V, is automatically aligned to the other arm of the polarization splitter, say arm V, as well. Due to the PDL impact, however, the SOP of signal V is no longer perfectly orthogonal to the SOP of signal H. So the SOP of signal V is not perfectly aligned to the arm V of the polarization splitter. In this case, the power of signal V is split into both arms of the polarization splitter, with $P \cos^2 \alpha$ in arm V and $P \sin^2 \alpha$ in arm H, where P is the power of signal V and $\alpha$ is the angle between its SOP and the vertical linear polarization. The power of $P \sin^2 \alpha$ in the arm H will be a crosstalk and cause penalty to the signal H at that polarization.

BRIEF SUMMARY OF THE INVENTION

In various exemplary embodiments, the present invention provides polarization mode dispersion compensation (PMDC) and polarization de-multiplexing systems and methods for polarization multiplexed (PolMux) optical transmission systems. The PMDC of the present invention detects an error signal before a polarization splitter in PolMux systems for controlling polarization controllers (PC) and/or DGDs in the PMDC for return-to-zero (RZ) differential m-phase shift keying (DmPSK) signals. The PMDC can be configured as one-stage, two-stage, or more stages, with each stage being a polarization controller, a DGD element, or the like. For bit-aligned PolMux systems, the error signal could be the level of clock frequency at one, two, or more times of the baud rate at one polarization. For bit-interleaved PolMux systems, the error signal could be the level of clock frequency at two times of the baud rate at one polarization. If the error signal is the level of clock frequency at two times of the baud rate at one polarization, the PMDC can work for both bit-aligned and bit-interleaved PolMux systems. Additionally, the PMDC could operate in PolMux systems with any arbitrary time offset between the two polarizations. The polarization demultiplexer of the present invention utilizes error detection at both output arms of a polarization splitter to mitigate PDL impact on any PolMux type of signal.

The present invention utilizes a power tap located anywhere between the polarization controller in PMDC and the polarization splitter in a polarization de-multiplexer. Because the error signal depends mainly on the value of DGD in the system, the PMDC can be locked in the cancellation mode. Accordingly, there is not switching between the cancellation mode and PSP mode for the PMDC of the present invention solving the dynamic limitation of most current PMDC. Additionally, the present invention does not need polarization scrambling or dithering of the transmitted signals and a polarization maintained tap and half bit DGD delay in the error signal path. The DGD in the PMDC can be either fixed or tunable. If it is tunable, the PMDC can cancel the DGD of fiber system completely and provide better performance.

In an exemplary embodiment of the present invention, a polarization mode dispersion compensator for polarization multiplexed Return-to-Zero signals includes a polarization control mechanism; a tap located after the polarization control mechanism and before a polarization splitter; an error detection circuit connected to the tap; and a control circuit configured to control the polarization control mechanism responsive to an error signal from the error detection signal. The error signal include one of a level of a basic clock frequency at a baud rate or at two or more times the baud rate at one polarization for bit-aligned polarization multiplexed systems and a level of a basic clock frequency at a two times the baud rate at one polarization for bit-interleaved polarization multiplexed systems; and wherein the error detection circuit is configured to detect the error signal. The polarization mode dispersion compensator can further include a polarization de-multiplexer including the polarization splitter. The polarization de-multiplexer includes a separate error signal for polarization control of the polarization de-multiplexer; wherein the separate error signal includes error signals at both output arms of the polarization splitter; and wherein the polarization de-multiplexer further includes a polarization de-multiplexer control circuit receiving the error signals at both output arms of the polarization splitter, wherein the polarization de-multiplexer control circuit is configured to control a polarization de-multiplexer polarization control mechanism to mitigate polarization dependent loss. Optionally, the polarization control mechanism includes one or more polarization controllers; and one or more differential group delays, wherein each of the one or more differential group delays include one of a fixed and tunable differential group delay; wherein each of the one or more polarization controllers and the one or more differential group delays are controlled by the control circuit. The polarization mode dispersion compensator can be locked in a cancellation mode. An input Return-to-Zero differential m-phase shift keying polarization multiplexed signal includes no polarization scrambling or dithering. The polarization mode dispersion compensator can further include an optical switch coupled to two outputs of the tap, wherein one of the two outputs includes a half-symbol period delay; wherein if the error signal is the level of the basic clock frequency at the baud rate, the switch selects the output without the half-symbol period delay for bit-aligned signals and selects the output with the half-symbol period delay for bit-interleaved signals; and wherein if the error signal is the level of the clock frequency at twice the baud rate, the switch selects the output with the half-symbol period delay for bit-aligned signals and selects the output without half-symbol period delay for bit-interleaved signals.

In another exemplary embodiment of the present invention, a polarization mode dispersion compensator for polarization multiplexed Return-to-Zero differential m-phase shift keying signals with arbitrary time offsets between polarizations includes a polarization control mechanism; a tap located after the polarization control mechanism; a delay mechanism connected to the tap, wherein the delay mechanism is configured to compensate for the arbitrary time offsets between polarizations; an error detection circuit connected to the delay mechanism; and a control circuit configured to control the polarization control mechanism responsive to an error signal from the error detection signal. The error signal includes the level of the basic clock frequency at the baud rate at one polarization; and the error detection circuit is configured to detect the error signal. The delay mechanism is configured to align the polarizations to a bit-aligned system; and wherein the error signal includes the level of the basic clock frequency at the baud rate at one polarization. The polarization mode dispersion compensator can further include a polarization de-multiplexer with a polarization splitter, wherein the tap is located before the polarization splitter. Optionally, the polarization de-multiplexer includes a separate error signal for polarization control of the polarization de-multiplexer; wherein the separate error signal includes error signals at both output arms of the polarization splitter; and wherein the polarization de-multiplexer further includes a polarization de-multiplexer control circuit receiving the error signals at both output arms of the polarization splitter, wherein the polarization de-multiplexer control circuit is configured to control a polarization de-multiplexer polarization control mechanism to mitigate polarization dependent loss. Alternatively, the polarization control mechanism includes one or more polarization controllers; and one or more differential group delays, wherein each of the one or more differential group delays comprise one of a fixed and tunable differential group delay; wherein each of the one or more polarization controllers and the one or more differential group delays are controlled by the control circuit. The polarization mode dispersion compensator can be locked in a cancellation mode. An input polarization multiplexed Return-to-Zero differential m-phase shift keying signal to the polarization mode dispersion compensator includes no polarization scrambling or dithering.

In yet another exemplary embodiment of the present invention, a method of analyzing and compensating polarization mode dispersion for polarization multiplexed Return-to-Zero differential m-phase shift keying signals includes receiving a polarization multiplexed Return-to-Zero differential m-phase shift keying signal; tapping an output of the polarization mode dispersion compensation; and generating an error signal responsive to the tapped output. The method can further include providing polarization mode dispersion compensation responsive to the error signal. Optionally, the method further includes delaying the tapped output responsive to a time offset between polarizations to form a bit-aligned system; wherein the error signal includes one of a level of a basic clock frequency at a baud rate or at two or more times the baud rate at one polarization for bit-aligned polarization multiplexed systems. The error signal includes one of a level of a basic clock frequency at a baud rate or at two or more times the baud rate at one polarization for bit-aligned polarization multiplexed systems and a level of a basic clock frequency at a two times the baud rate at one polarization for bit-interleaved polarization multiplexed systems; wherein the error signal is utilized only for providing polarization mode dispersion compensation; and wherein the polarization mode dispersion compensation is locked in a cancellation mode.

In yet another exemplary embodiment of the present invention, a polarization de-multiplexer for polarization multiplexed optical signals includes a polarization controller; a polarization splitter coupled to the polarization controller; a first output tap and a second output tap, wherein each of the first output tap and the second output tap are coupled to the polarization splitter; a first error detection circuit coupled to the first output tap; a second error detection circuit coupled to the second output tap; and a control circuit coupled to the first error detection circuit and the second error detection circuit. The control circuit is configured to: receive separate error signals from each of the first error detection circuit and the second error detection circuit; process the separate error signals; and control the polarization controller to minimize both the error signals.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

Figure 1:
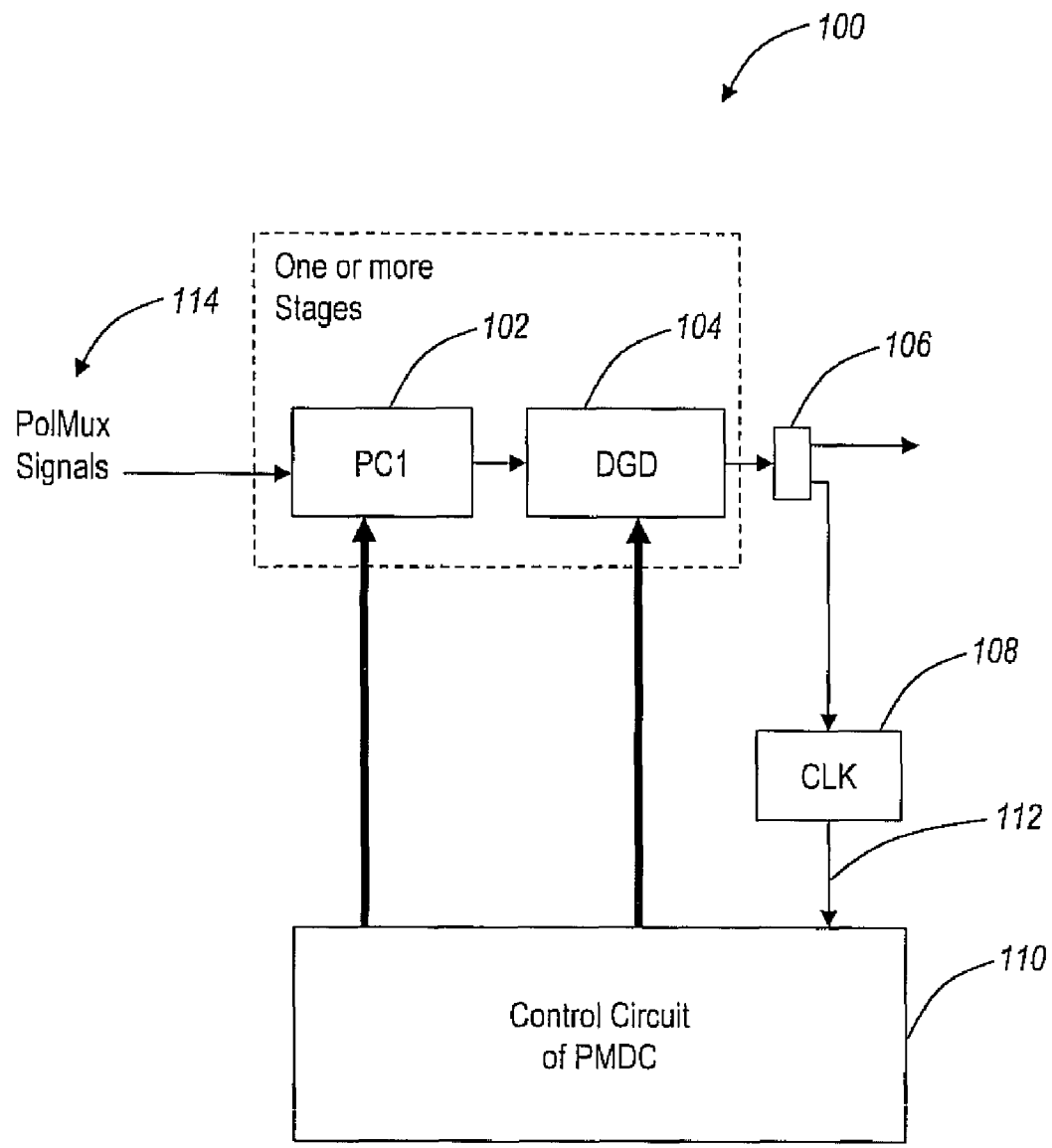
FIG. 1 is a polarization mode dispersion compensator (PMDC) configured to detect error signals before a polarization splitter for PolMux systems according to an exemplary embodiment of the present invention.

In various exemplary embodiments, the present invention provides a polarization mode dispersion compensator (PMDC) for polarization multiplexed (PolMux) optical transmission systems. The PMDC of the present invention detects an error signal before a polarization splitter in PolMux systems for return-to-zero (RZ) differential m-phase shift keying (DmPSK) signals. The PMDC can include one, two, or more stages. The detected error signal is used to control polarization controllers (PC) and/or DGDs in the PMDC only. A polarization controller for a polarization de-multiplexer can be controlled by other error signals. This allows the PMDC control loop to work independently with the polarization de-multiplexer control loop. For bit-aligned PolMux systems, the error signal could be the level of clock frequency at one, two or more times of the baud rate at one polarization. For bit-interleaved PolMux systems, the error signal could be the level of clock frequency at two times of the baud rate at one polarization. If the error signal is the level of clock frequency at two times of the baud rate at one polarization, the PMDC can work for both bit-aligned and bit-interleaved PolMux systems. The polarization de-multiplexer of the present invention utilizes error detection at both output arms of a polarization splitter to mitigate PDL impact on any PolMux type of signal.

The present invention utilizes a power tap located anywhere between the last DGD element in PMDC and the polarization splitter, i.e. before the polarization splitter. Because the error signal depends mainly on the value of DGD in the system, the PMDC can be locked in the cancellation mode. Accordingly, there is no switching between the cancellation mode and PSP mode for the PMDC of the present invention solving the dynamic limitation of most current PMDCs. Additionally, the present invention does not need polarization scrambling or dithering of the transmitted signals and a polarization maintained tap and half bit DGD delay in the error signal path. The DGD in the PMDC can be either fixed or tunable. If it is tunable, the PMDC can cancel the DGD of fiber system completely and provide better performance.

The reason of the dynamic limitation of conventional PMDCs is that there is no error signal at the receiver to differentiate the cancellation mode from the PSP mode. Regardless of whether the error signal is the degree of polarization, radio frequency (RF) power, eye closure, bit error rate, or the like, the error signal can be locked in its optimal state in either mode. Such a PMDC can work in either mode and have no idea which mode it is in at a given moment. So whenever a switch between the two modes is triggered by the dynamic change of input polarization or fiber PMD vector, the PMDC is not locked in its optimal state in the transient period and may cause PMD outage to the system.

This fundamental problem for PMDCs can be solved in polarization multiplexed systems. Polarization multiplexed systems include signals at two orthogonal polarizations. The relative time delay between the two orthogonal polarizations at the same wavelength can be used to determine the DGD of the fiber system, regardless of the SOP of input signal and PSPs of the fiber system.

For RZ-DBPSK or RZ-DQPSK signals, there is always a return-to-zero optical pulse in every symbol period. The signals show periodical optical pulses in the time domain. The period of the pulse train is the symbol period and the frequency is the baud rate. For example, the frequency of the pulse train is X GHz for an X Gbit/s RZ-DBPSK signal and X/2 GHz for an X Gbit/s RZ-DQPSK signal, respectively.

In bit-aligned PolMux systems, the optical pulses at the two polarizations are synchronized and overlap with each other in the time domain. The period of the combined pulse train is still the symbol period of the signal at one polarization. In bit-interleaved polarization multiplexed systems, the optical pulses at the two polarizations have a time offset of a half symbol period. So the period of the combined pulse train is now half of the symbol period of the signal at on polarization and the frequency is two times of the baud rate.

If an amplitude detector is placed in front of the polarization splitter, it can detect the electrical fields in both polarizations. The electrical fields at the two orthogonal polarizations do not interact with each other in the amplitude detection process. When there is no DGD in the system, there is no time delay between the two polarizations, and there is no pulse broadening in every polarization due to DGD. The detector can detect a clock signal at the frequency of the baud rate of the combined signals, which is the baud rate for bit-aligned PolMux systems and two times of baud rate for bit-interleaved PolMux systems, respectively.

For bit-aligned PolMux systems, the present invention monitors the level of the clock frequency at the baud rate. When there is DGD in the system, the evolution of the optical pulse in each polarization depends on the inject angle between the SOP of the signal and the fast axis of the PSPs of the fiber system. Assuming the inject angle is a for the signal in one polarization, say polarization H, the power of the signal, say $P_h$, will be split into the two PSPs with the power of $P_h \cos^2\alpha$ and $P_h \sin^2\alpha$, respectively, at the transmitter side of the system. Because the other polarization, say polarization V, is orthogonal to polarization H, the inject angle will be $\alpha+\pi/2$ for polarization V. The power of signal in polarization V, say $P_v$, will be split into the two PSPs with the power of $P_v \sin^2\alpha$ and $P_v \cos^2\alpha$, respectively. Note, that the total power of the two signals in both PSPs will be constant and independent of $\alpha$ as long as $P_h$ equals $P_v$. At the end of the system, optical power in the two PSPs will have a relative time delay caused by DOD in the system. The photocurrent in a symbol period of the optical detector in front of the polarization splitter will be $$i(t) \propto P(t)+P(t-\tau)-[P(t)-P(t-\tau)]\sin(2\alpha)\cos(\Delta\Phi),$$

where P(t) is the optical pulse shape of the signals, $\tau$ is the DGD value in the system, $\alpha$ is the angle between polarization H and the fast axis of the PSPs of the system, $\Delta\Phi$ is the optical phase difference between the two polarizations. The first two terms on the right side of the equation represent the pulse broadening caused by the DGD $\tau$. The third term represents the variation on the broadening depending on $\tau$, $\alpha$, and $\Delta\Phi$. One extreme case is when $\alpha$ is 0 or 90 degrees. The detected pulse of the two polarizations is broadened to $P(t)+P(t-\tau)$ from 2P(t), which decreases the level of the clock frequency. When $\alpha$ is 45 degrees, the third term depends on $\Delta\Phi$. The detected pulse becomes $2P(t-\tau)$ when $\Delta\Phi$ is 0 and 2P(t) when $\Delta\Phi$ is $\pi$. If $\Delta\Phi$ is constant at either 0 or $\pi$, there would be no pulse broadening for the combined pulse. However, $\Delta\Phi$ includes both the random phase difference between the two optical sources ($\Delta\Phi s$) and the phase difference between the two phase-modulated signals ($\Delta\Phi m$). While $\Delta\Phi s$ may be a constant over the period of many bits, $\Delta\Phi m$ is randomly 0 or $\pi$ for DBPSK signals and 0, $\pi/2$, $\pi$, or $-\pi/2$ for DQPSK signals. So the other extreme case is that the detected pulse is randomly $2P(t-\tau)$ or 2P(t), which also decreases the level of clock frequency. When $\alpha$ and $\Delta\Phi$ are other values, the decrease of the clock frequency level falls in between the two extreme cases. By simulation, it was determined that the difference of the clock frequency levels between the extreme cases is relatively small, which means the decrease of clock frequency level is caused mainly by r and only slightly by $\alpha$. The difference increases with $\tau$ because $[P(t)-P(t-\tau)]$ increases. Accordingly, the clock frequency level can be used as an error signal for $\tau$ regardless of a to lock the PMDC in the cancellation mode by minimizing $\tau$.

The basic clock frequency is at the baud rate of one polarization in bit-aligned PolMux systems. However, there is also power at the frequencies of two or more times of the basic clock frequency, though the power level is lower than that of the basic clock frequency. Like the level of basic clock frequency, the levels of higher order clock frequency also drops as the DGD value increase in the system. So they can also be used as error signals in bit-aligned PolMux systems.

For bit-interleaved PolMux systems, the basic clock frequency detected by the optical detector is two times of the baud rate at one polarization. For example, the clock frequency is 500 Hz for a 100 Gbit/s DQPSK system and 20 GHz for a 40 GHz DQPSK system, respectively. When there is PMD in the system, the pulse evolution at the two polarizations depends on the DGD value and the inject angle between the SOPs of signals and the PSPs of fiber system. When the inject angle is 0 or 90 degrees, the inject polarizations are aligned with the PSPs of the fiber system. The optical pulses will not be distorted at either polarization. However, the time offset between the two polarizations is changed by the DGD. This offset from the original half symbol period offset decreases the level of clock frequency at two times of the baud rate. When the inject angle is 45 degrees, the optical pulses at the two polarizations are all broadened by the DGD in the system, while their relative time offset is unchanged. The broadening of the optical pulses also decreases the level of clock frequency. When the inject angle is between 0 and 45 degrees, there is both pulse broadening in each polarization and change of time offsets between the two polarizations. The level of clock frequency is also decreased. The decreases of the level of clock frequency in all these cases are about the same. It means the level of clock frequency only slightly depends on the inject angle and can be used as the error signal to work in the cancellation mode. Accordingly, the level of the clock frequency at two times the baud rate of one polarization can be used as error signal for both bit-aligned and bit-interleaved PolMux systems.

Referring to FIG. 1, a PMDC 100 is configured to detect error signals before a polarization splitter for PolMux systems according to an exemplary embodiment of the present invention. The PMDC 100 includes a polarization controller (PC1) 102, a fixed or tunable DGD module 104, an optical tap 106, an error detection circuit (CLK) 108, and a control circuit 110. The polarization controller 102 and the DGD module 104 can be repeated to build a two or more stage PMDC. In operation, the PMDC 100 receives a PolMux input signal 114 into the PC1 102 and the DGD 104. The signal 114 could be RZ phase-modulated, which could be DBPSK, DQPSK, D8PSK, or any other phase modulation formats (DmPSK). Additionally, the signal 114 can be a bit-aligned or a bit-interleaved PolMux signal. The tap 106 provides an input to the error detection circuit (CLK) 108. The error detection circuit (CLK) 108 is configured to detect the clock frequency for use as an error signal 112 input to the control circuit 110. Accordingly, the control circuit 110 utilizes the error signal to control the PC1 102 and the DGD 104. Also, if there are multiple stages, the control circuit 110 also controls PCs and DGDs in these additional stages.

The error signal 112 used for the PMDC 100 from the tap 106 could be the level of a basic clock frequency at the baud rate for bit-aligned polarization multiplexed systems. For example, the clock frequency is 25 GHz for a 100 Gbits/s PolMux DQPSK system and 20 GHz for a 40 Gbits/s PolMux DBPSK system, respectively. The error signal 112 could also be the level of clock frequency at two or more times of the baud rate. The error signal could be the level of clock frequency at two times of the baud rate at one polarization. If the error signal 112 is the level of clock frequency at two times the baud rate, the system can be either bit-aligned or bit-interleaved polarization multiplexed. For example, the clock frequency could be 20 GHz for a 40 Gbit/s PolMux DQPSK system, either bit-aligned or bit-interleaved. The control circuit 110 detects the level of the error signal 112, and controls the state of PC1 102 and/or the value of DGD 104 to optimize the error signal 112.

Figure 2:
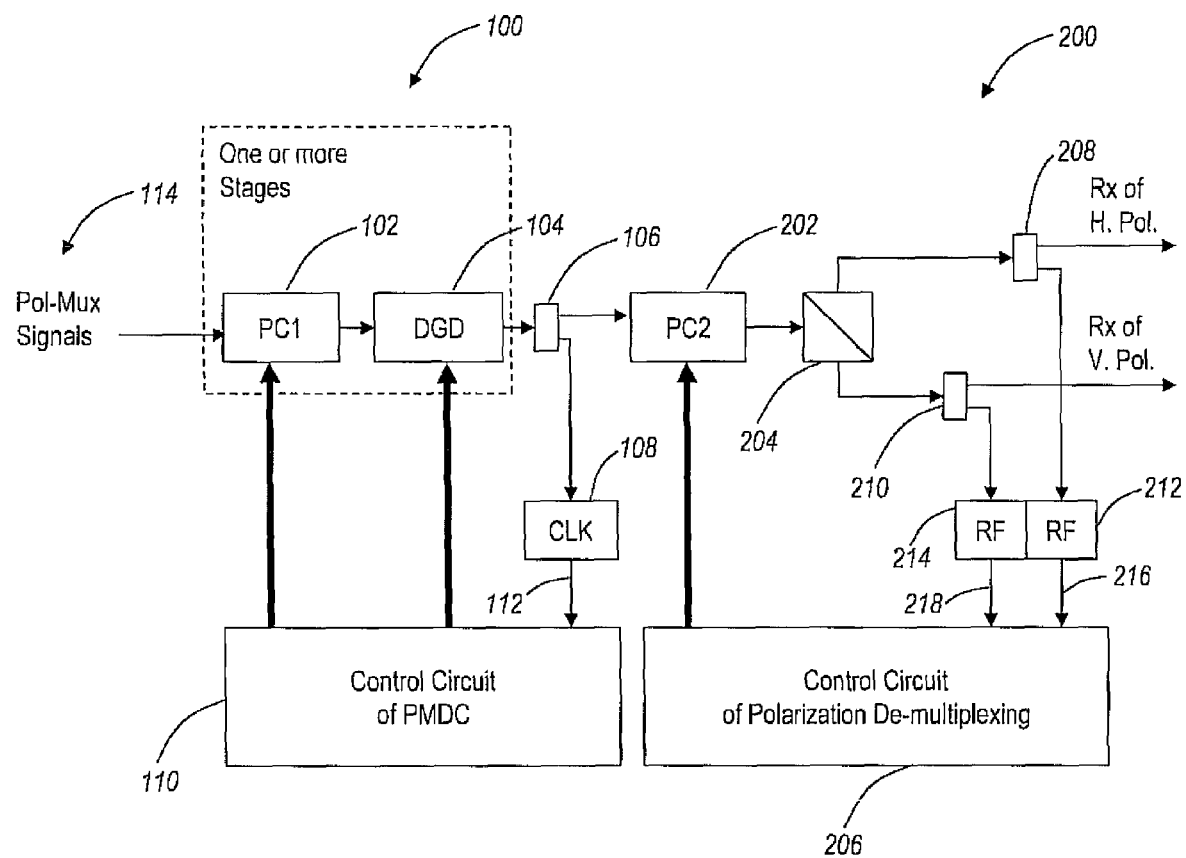
FIG. 2 is a polarization de-multiplexer after the PMDC of FIG. 1 for tracking and splitting the two orthogonal polarizations according to an exemplary embodiment of the present invention.

Referring to FIG. 2, after the PMDC 100, a polarization de-multiplexer 200 can be utilized to track and split the two orthogonal polarizations according to an exemplary embodiment of the present invention. The polarization de-multiplexer 200 includes a polarization controller (PC2) 202, a polarization splitter 204, and a control circuit 206. The polarization controller (PC2) 202 is used to track and align the two orthogonal polarizations to the horizontal and vertical polarizations, which are then split by the polarization splitter 204. Outputs of the polarization splitter 204 (i.e., horizontal and vertical polarizations) are provided to separate taps 208, 210. The taps 208, 210 provide an output to receivers (not shown) for each of the horizontal and vertical polarizations and to power detectors 212, 214 of low frequency radio frequency (RF) spectrum.

In the present invention, error signals 216, 218 can be detected at either or both arms of the polarization splitter. If error signals 216, 218 are detected at both arms, the error signals 216, 218 can be processed to mitigate the impact of polarization dependent loss (PDL) or polarization dependent gain (PDG) in the system. The error signal 216, 218 could be the low frequency RF power generated by the beating between signals at the horizontal and vertical polarizations. The control circuit 206 detects the error signal 216, 218 and controls the PC2 202 to optimize the error signal 216, 218. Note that the PMDC 100 detects its error signal 112 before the polarization splitter 204 while the polarization de-multiplexer 200 detects its error signal 216, 218 after the polarization splitter 204. Because the different error signals 112, 216, 218 and control circuits 110, 206, the control loops of the PMDC 100 and the polarization de-multiplexer 200 can work totally independent. Advantageously, this improves the flexibility and robustness of the total system. Of course there could also be some interaction between the two control loops.

Figure 3:
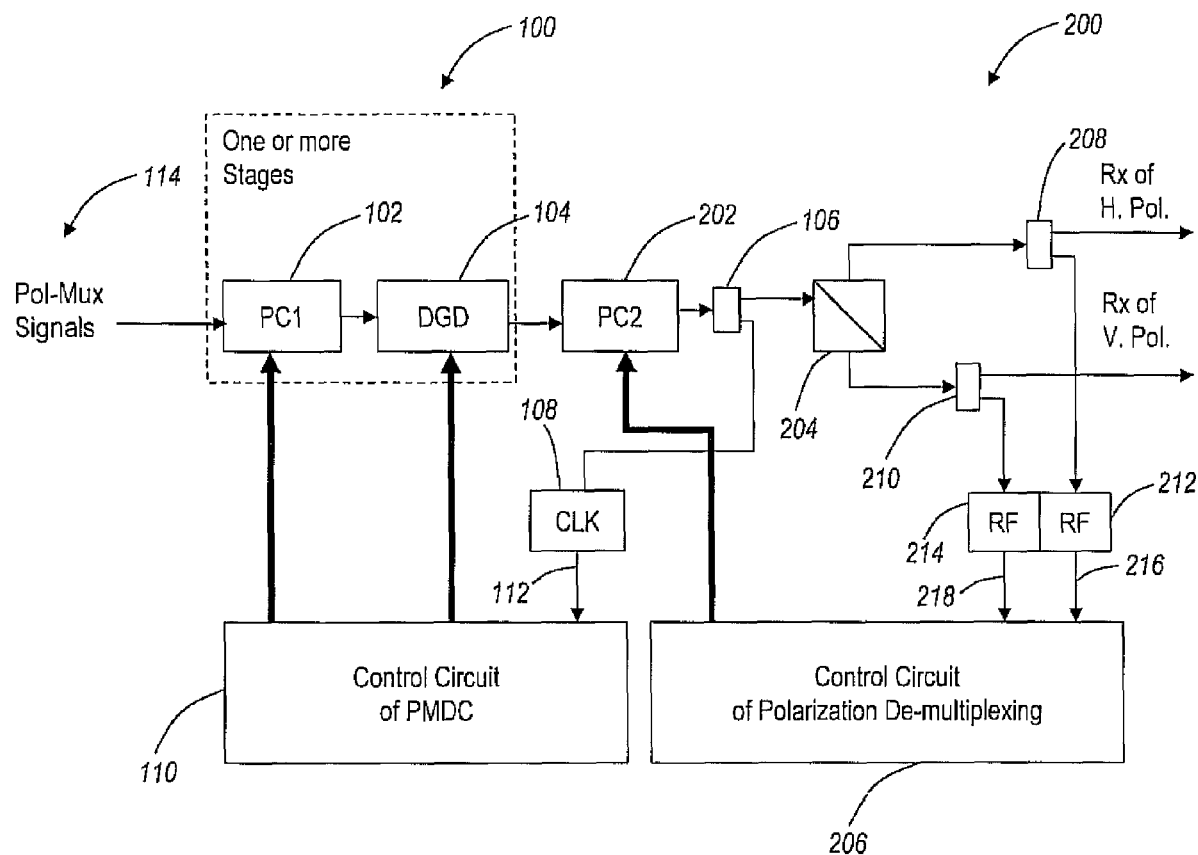
FIG. 3 is a polarization de-multiplexer after the PMDC of FIG. 1 for tracking and splitting the two orthogonal polarizations with the tap located in a different location from FIG. 2 according to an exemplary embodiment of the present invention.

Referring to FIG. 3, because the error signal 112 for PMDC 100 only slightly depends on the signal SOP, the tap 106 can be located anywhere between the last DGD 104 module in the PMDC 100 and the polarization splitter 204. For example, the tap 106 can be located between the PC2 202 and the polarization splitter 204. Those of ordinary skill in the art will recognize that the present invention contemplates other configurations of the PMDC 100 and the polarization de-multiplexer 200 for generating the error signal 112 and the error signals 218, 216.

Figure 4:
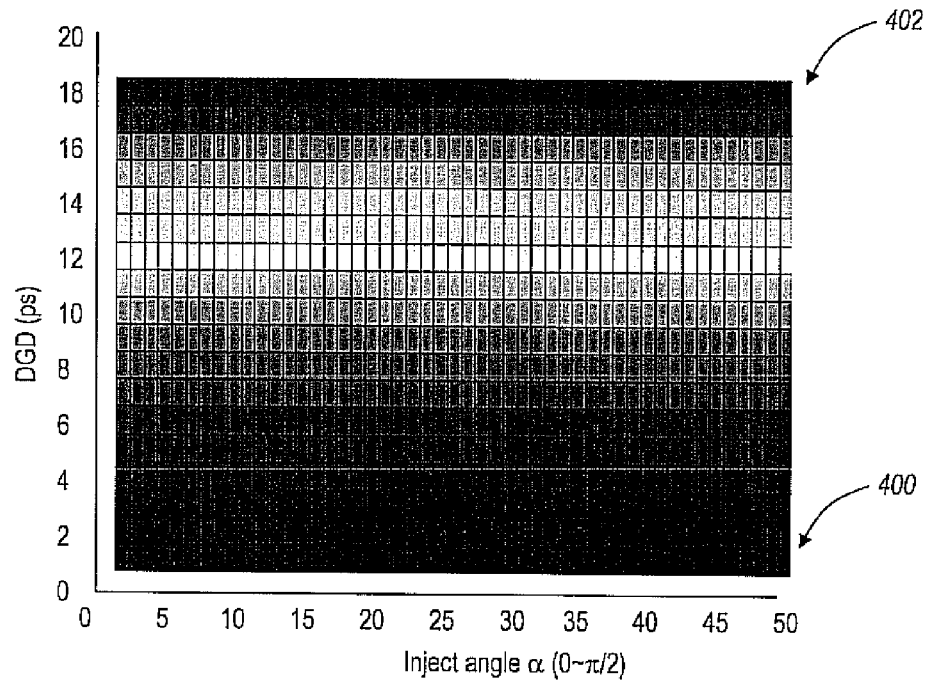
FIGS. 4 and 5 are graphs of a simulated level of a clock signal at 28 GHz for an 112 Gbits/s bit-aligned polarization multiplexed 33% RZ-DQPSK system according to an exemplary embodiment of the present invention.
Figure 5:
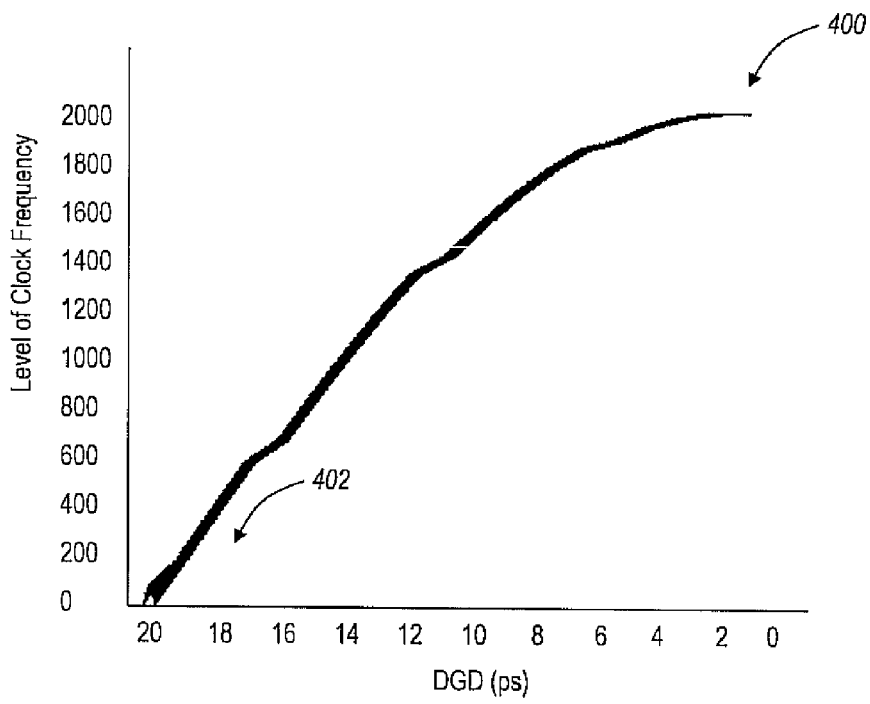

Referring to FIGS. 4 and 5, graphs show a simulated level of a clock signal at 28 GHz for an 112 Gbits/s bit-aligned polarization multiplexed 33% RZ-DQPSK system according to an exemplary embodiment of the present invention. FIG. 4 is a contour graph illustrating the level of clock frequency as a function of inject angle $\alpha$ from 0 to $\pi/2$ on the x-axis and DGD level in picoseconds (ps) on the y-axis. Shading 400, 402 in FIG. 4 shows the level of clock frequency: the shading 400 is high and the shading 402 is low. FIG. 4 shows the level of clock frequency depends on the value of DGD, but not substantially on the inject angle. FIG. 5 is a three-dimensional view of FIG. 4. FIG. 5 shows the relationship between the level of frequency and the DGD value.

Figure 6:
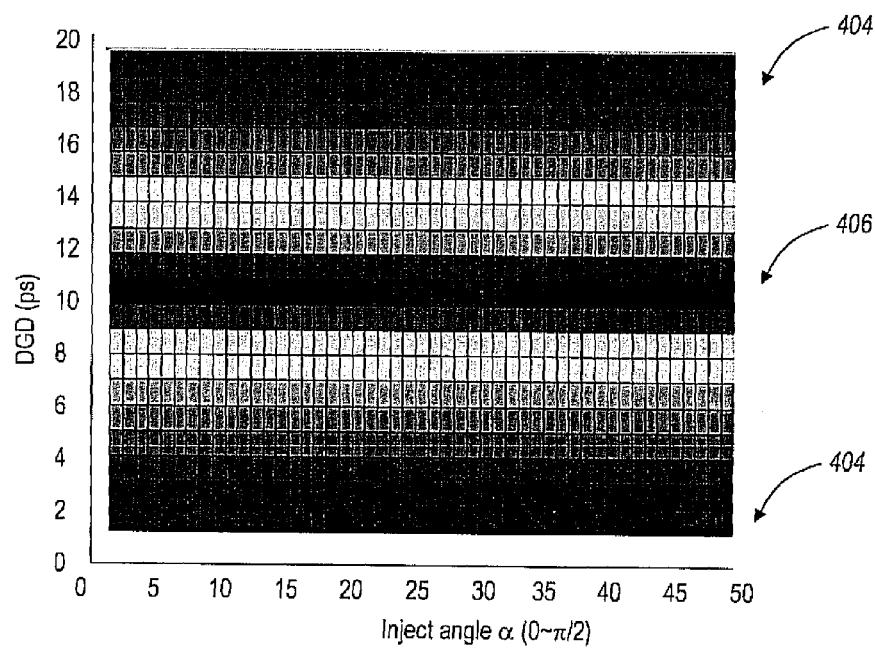
FIGS. 6 and 7 are graphs of a simulated level of clock signal at 56 GHz for an 112 Gbits/s bit-aligned polarization multiplexed 33% RZ-DQPSK system according to an exemplary embodiment of the present invention.
Figure 7:
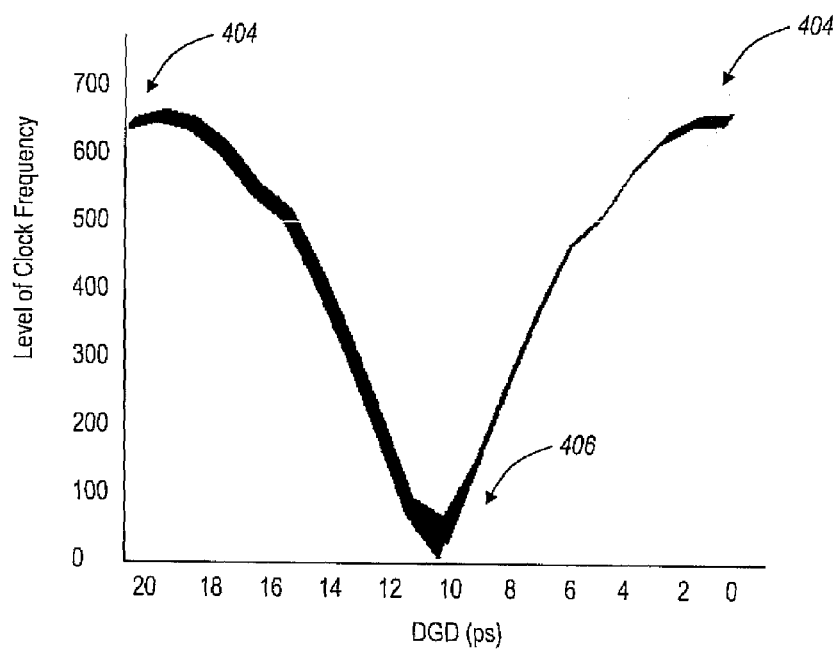

Referring to FIGS. 6 and 7, graphs show a simulated level of clock signal at 56 GHz for an 112 Gbits/s bit-aligned polarization multiplexed 33% RZ-DQPSK system according to an exemplary embodiment of the present invention. FIG. 6 is a contour graph illustrating the level of clock frequency as a function of inject angle $\alpha$ from 0 to $\pi/2$ on the x-axis and DGD level in picoseconds (ps) on the y-axis. Shading 404, 406 in FIG. 6 shows the level of clock frequency: the shading 404 is high and the shading 406 is low. Similar to FIGS. 4 and 5, FIGS. 6 and 7 show the level of clock frequency depends on the value of the DGD, but not on the inject angle. FIG. 7 is a three-dimensional view of FIG. 6. FIG. 7 shows the relationship between the level of clock frequency and the DGD value. FIG. 7 also shows that the error signal level is lower than that of the 28 GHz error signal, and the DGD compensation range is half of that of the 28 GHz error signal.

Figure 8:
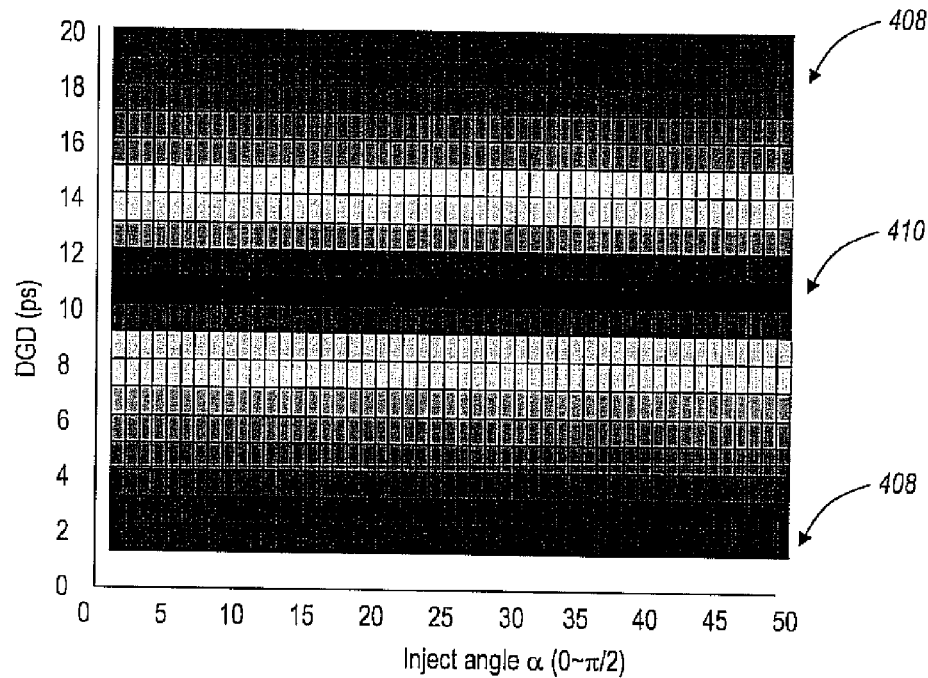
FIGS. 8 and 9 are graphs of a simulated level of clock signal at 56 GHz for an 112 Gbits/s bit-interleaved polarization multiplexed 33% RZ-DQPSK system according to an exemplary embodiment of the present invention.
Figure 9:
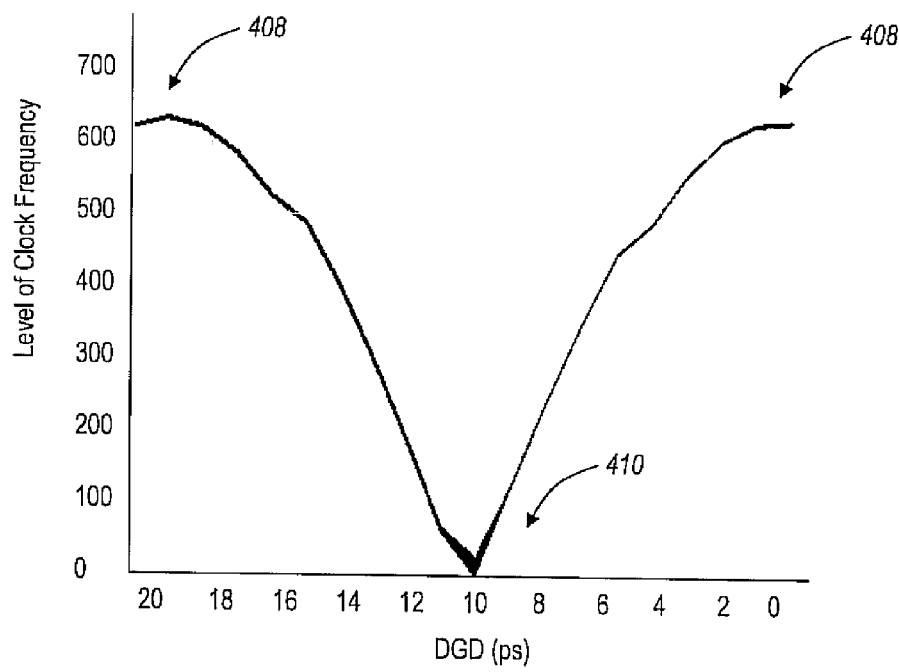

Referring to FIGS. 8 and 9, graphs show a simulated level of clock signal at 56 GHz for an 112 Gbits/s bit-interleaved polarization multiplexed 33% RZ-DQPSK system according to an exemplary embodiment of the present invention. FIG. 8 is a contour graph illustrating the level of clock frequency as a function of inject angle α from 0 to π/2 on the x-axis and DGD level in picoseconds (ps) on the y-axis. Shading 408, 410 in FIG. 8 shows the level of clock frequency: the shading 408 is high and the shading 410 is low. FIG. 8 shows the level of clock frequency depends on the value of the DGD, but not on the inject angle. FIG. 9 is a three-dimensional view of FIG. 8. FIG. 9 shows the relationship between the level of frequency and the DGD value.

FIG. 6 through FIG. 9 also show that the levels of clock signal at 56 GHz are about the same for bit-aligned and bit-interleaved PolMux systems. Accordingly, the PMDC 100 of the present invention with an error signal of the 56 GHz clock power can work for both bit-aligned and bit-interleaved systems. Advantageously, this increases the flexibility of the PMDC 100.

Figure 10:
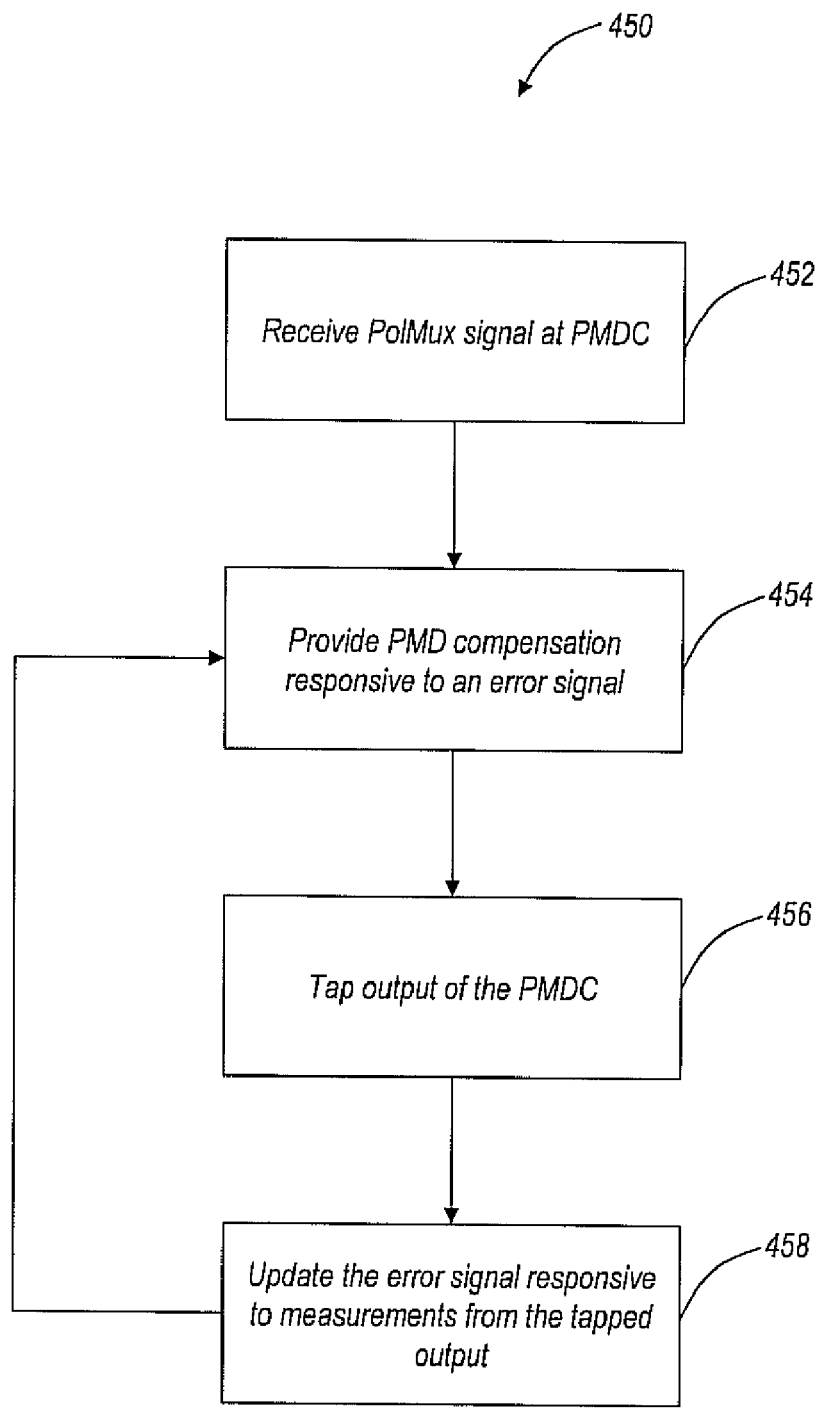
FIG. 10 is a flowchart of a PMD compensation mechanism for PolMux signals according to an exemplary embodiment of the present invention.

Referring to FIG. 10, a flowchart illustrates a PMD compensation mechanism 450 for PolMux signals according to an exemplary embodiment of the present invention. The PMD compensation mechanism 450 begins by receiving a PolMux signal at a PMDC (step 452). PMD compensation is provided responsive to an error signal (step 454). The PMD compensation can include polarization controllers, DGDs, a control circuit for the polarization controllers and the DGDs, and the like. The control circuit is configured to operate the polarization controllers and the DGDs responsive to the error signal. An output of the PMDC is tapped (step 456). The error signal is updated responsive to measurements from the tapped output (step 458).

As described herein, the error signal can be measured through a detector receiving the tapped output. The error signal can include the level of a basic clock frequency at the baud rate or at two or more times the baud rate for bit-aligned polarization multiplexed systems. For bit-interleaved PolMux systems, the basic clock frequency detected by the optical detector is two times of the baud rate at one polarization.

It was shown in D. van den Borne, et al, "1.6-b/s/Hz spectrally efficient transmission over 1700 km of SSMF using 40×85.6-Gb/s POLMUX-RZ-DQPSK", Journal of Lightwave Technology, vol. 25, no. 1, pp. 222-232, 2007 that bit-aligned PolMux signals have higher PMD tolerance than bit-interleaved PolMux signals, while bit-interleaved PolMux signals have higher non-linearity tolerance than bit-aligned PolMux signals. Depending on whether PMD or non-linearity has a higher penalty in a given optical system, either bit-aligned or bit-interleaved PolMux signals may have better performance. Accordingly, optical system performance may be optimized if the time offset between the two polarizations can be optimized from 0 (bit-aligned) to T/2 (bit-interleaved).

Figure 11:
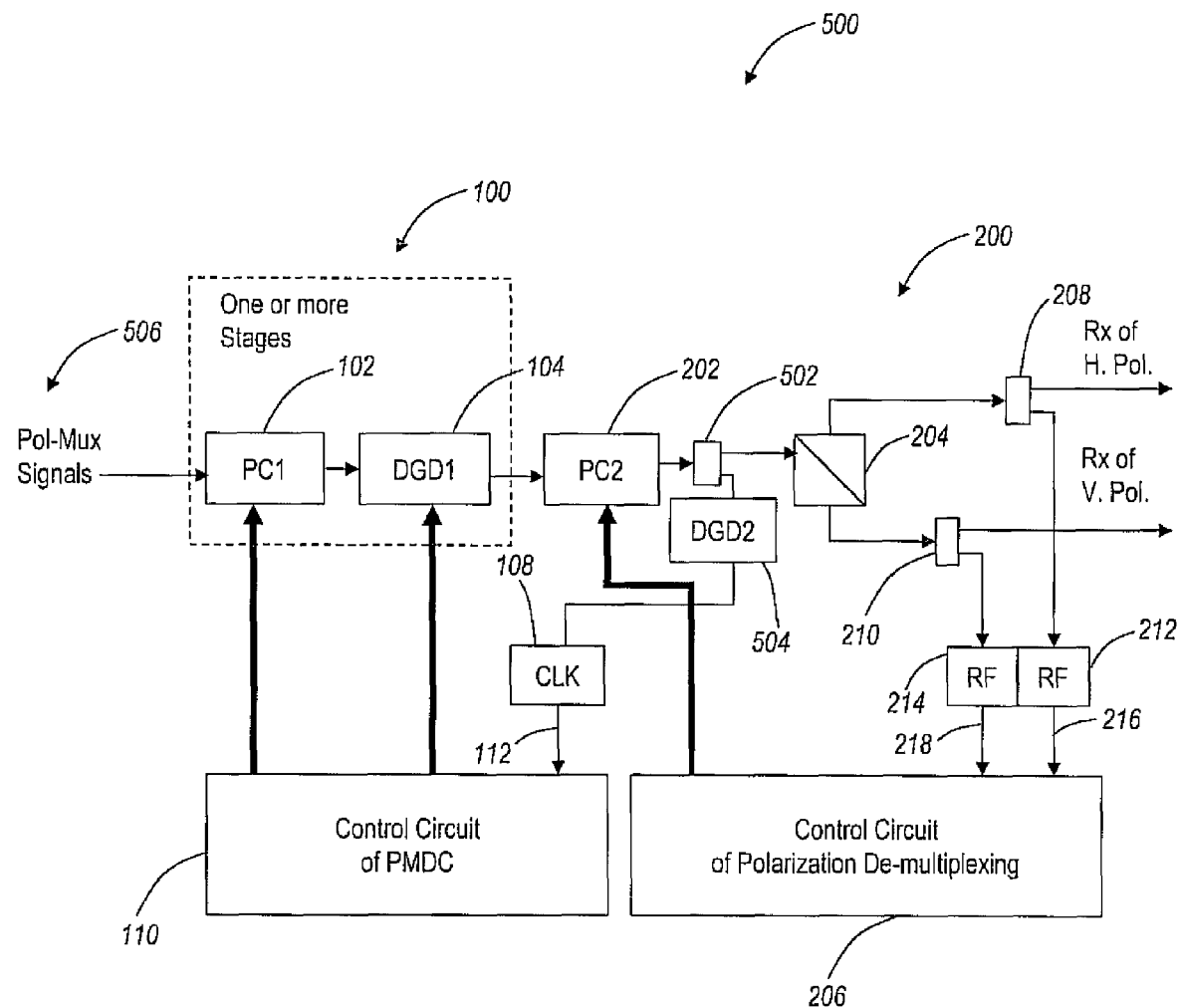
FIG. 11 is a PMDC and polarization de-multiplexer for PolMux systems with arbitrary time offset between the two polarizations according to an exemplary embodiment of the present invention.

Referring to FIG. 11, a PMDC and polarization de-multiplexer 500 for PolMux systems with any time offset between the two polarizations is illustrated according to an exemplary embodiment of the present invention. The PMDC and polarization de-multiplexer 500 includes a PMDC 100 and a polarization de-multiplexer 200. The PMDC 500 includes a polarization controller (PC1) 102, a fixed or tunable DGD module (DGD1) 104, a polarization maintaining optical tap (PM Tap) 502, a tunable DGD module (DGD2) 504, an error detection circuit (CLK) 108, and a control circuit 110. The polarization controller (PC1) 102 and the DGD module (DGD1) 104 can be repeated to build a two-stage or more-stage PMDC. The PMDC and polarization de-multiplexer 500 is configured to receive input PolMux signals 506. The signals 506 could be RZ phase-modulated, which could be DBPSK, DQPSK, D8PSK or any other phase modulation formats. In this exemplary embodiment, the signals 506 can have an arbitrary time offset between horizontal and vertical polarizations as well as being either bit-aligned or bit-interleaved PolMux systems.

The PMDC 100 generates an error signal 112 from the PM Tap 502. The error signal 112 could be the level of clock frequency at the baud rate of the signal 506 at one polarization. The value of the DGD2 504 is set to the time offset between the pulse trains of the two polarizations to accommodate for the arbitrary time offset. The value of the DGD2 502 should be 0 for bit-aligned PolMux signals and half of the symbol period (T/2) for bit-interleaved PolMux signals, respectively. If the time offset between polarizations is optimized to be between 0 and half of the symbol period for a system, the DGD value should also be set to the value of the time offset. The DGD2 504 is used to shift the pulse trains of the two polarizations back to bit-aligned status. This shift generates a clock frequency at the baud rate. For example, the clock frequency is 25 GHz for a 100 Gbits/s PolMux DQPSK system and 20 GHz for a 40 Gbits/s PolMux DBPSK system, respectively. The control circuit 110 detects the level of the clock frequency and controls the state of the PC1 102 and the value of the DGD1 104 to optimize the error signal 112.

Working with the PMDC, a polarization de-multiplexer 200 tracks and splits the two orthogonal polarizations by detecting an error signal 218, 216 after a polarization splitter 204. The error signal 218, 216 could be the low frequency radio frequency (RF) power generated by the beating of the two polarizations (detected through taps 208, 210 by RF detectors 212, 214 respectively). A control circuit 206 detects the level of the error signal 218, 216 and controls another polarization controller (PC2) 202 to optimize the error signal 218, 216. The PM Tap 502 and the DGD2 504 of the PMDC 100 have to be located after the PC2 202 because they need the PC2 202 to track and align the two polarizations to the two PSPs of the DGD2 202.

Advantageously, the PMDC and polarization de-multiplexer 500 includes the DGD2 504 as a tunable element for PolMux signals with any arbitrary time offset, the error signal 112 of the PMDC 100 is used for the control of the PC1 102 of the PMDC 100 only, and not for the control of PC2 202 of the polarization de-multiplexer 200, and the error signal 112 of PMDC 100 can also be used to control the value of the DGD 104 in the PMDC 100.

In the present invention, the PMDC 100 and the polarization de-multiplexer 200 have separate error signals 112, 218, 216 and control circuits 110, 206. The control circuit 206 of the polarization de-multiplexer 200 works to align the SOPs of the signals to the required state of the polarization splitter 204, while the control circuit 110 of the PMDC 100 works to minimize the total DGD value in the system. Advantageously, the control performance of one control circuit does not need to be compromised for the other as in done in conventional systems.

The objective of the PMDC control circuit 110 is to minimize the total DGD by setting the direction of the PMD vector of the PMDC 100 to the opposite direction of the PMD vector of the fiber system. If the DGD value in the PMDC 100 is fixed, the optimized DGD value in the system is not zero usually if the DGD value in fiber system is not equal to the DGD value in the PMDC 100. This residual DGD, though already minimized, may still introduce penalty to the system. A tunable DGD can be used to always compensate all DGD in fiber system to make the total DGD zero, at least to the first order.

Figure 12:
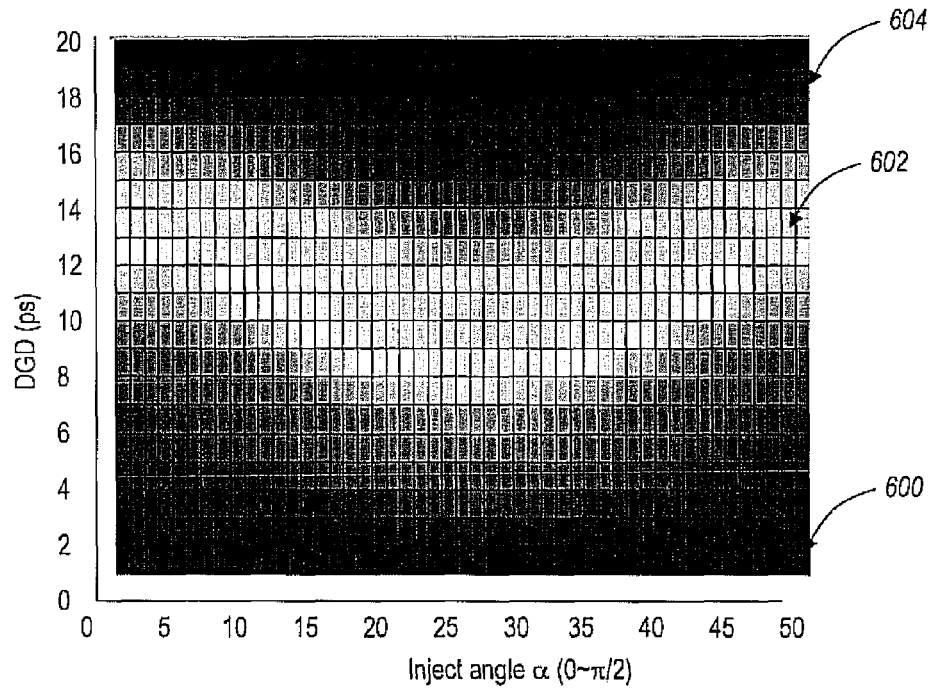
FIGS. 12 and 13 are graphs of a simulated level of a 28 GHz clock frequency for an 112 Gbits/s bit-interleaved polarization multiplexed 33% RZ-DQPSK system according to an exemplary embodiment of the present invention.
Figure 13:
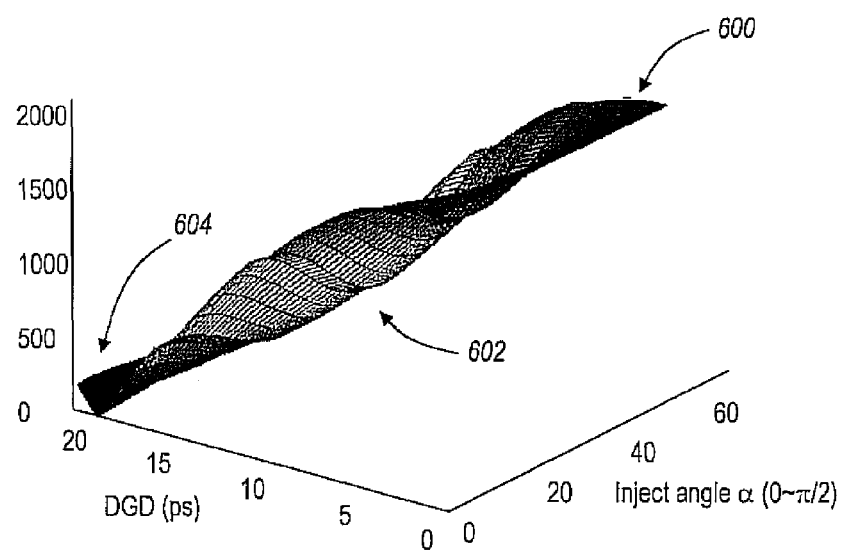

Referring to FIGS. 12 and 13, graphs show a simulated level of a 28 GHz clock frequency for an 112 Gbits/s bit-interleaved polarization multiplexed 33% RZ-DQPSK system according to an exemplary embodiment of the present invention. The value of the DGD2 504 is set to T/2, which is approximately 17.86 ps in this system. FIG. 12 is a contour graph illustrating the level of clock frequency as a function of inject angle α from 0 to π/2 on the x-axis and DOD level in picoseconds (ps) on the y-axis. Shading 600, 602, 604 in FIG. 12 shows the level of clock frequency: the shading 602 is high, the shading 604 is lower that the shading 602, and the shading 604 is low. FIG. 13 is the three-dimensional view of FIG. 12. FIGS. 12 and 13 show the level of clock frequency depends on the value of the DGD, and just slightly on the inject angle.

Figure 14:
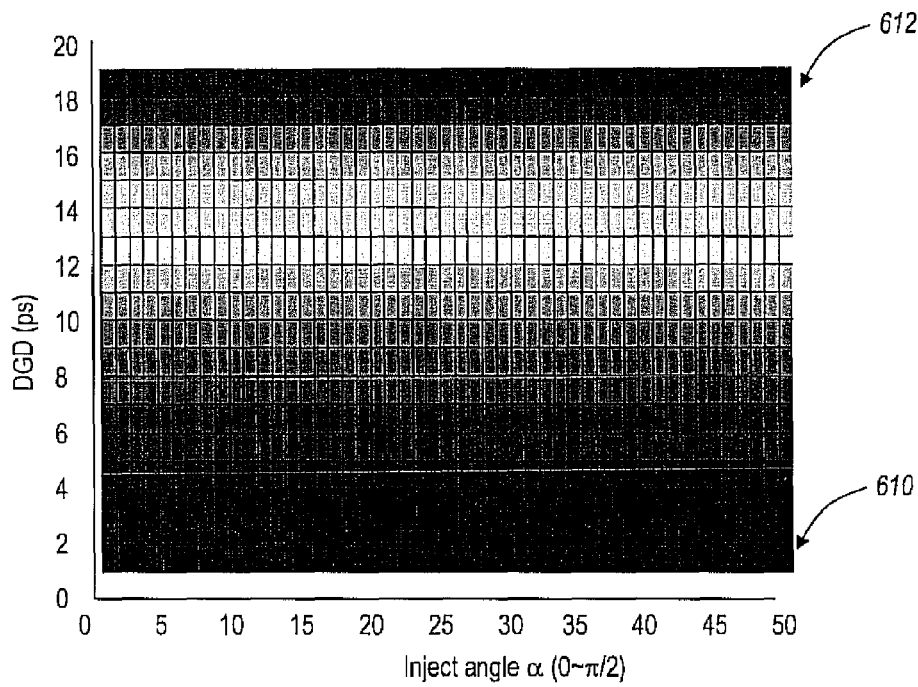
FIGS. 14 and 15 are graphs of a simulated level of a 28 GHz clock frequency for an 112 Gbits/s bit-aligned polarization multiplexed 33% RZ-DQPSK system according to an exemplary embodiment of the present invention.
Figure 15:
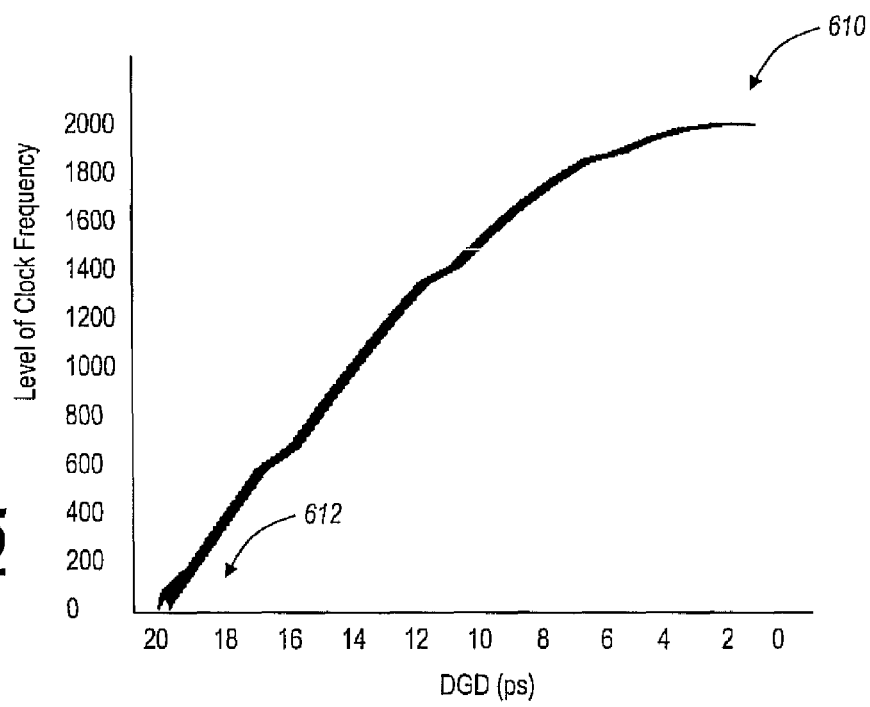

Referring to FIGS. 14 and 15, graphs show a simulated level of a 28 GHz clock frequency for an 112 Gbits/s bit-aligned polarization multiplexed 33% RZ-DQPSK system according to an exemplary embodiment of the present invention. The value of the DGD2 504 is set to 0 in this system. FIG. 14 is a contour graph illustrating the level of clock frequency as a function of inject angle α from 0 to π/2 on the x-axis and DGD level in picoseconds (ps) on the y-axis. Shading 610, 612 in FIG. 14 shows the level of clock frequency: the shading 610 is high and the shading 612 is low. FIG. 14 shows the level of clock frequency depends on the value of the DGD, but not on the inject angle. FIG. 15 is a three-dimensional view of FIG. 14. FIG. 15 shows the relationship between the level of frequency and the DGD value. FIGS. 14 and 15 show that the error signal for bit-aligned PolMux signals have better quality for the control because it does not depend on the inject angle at all.

Figure 16:
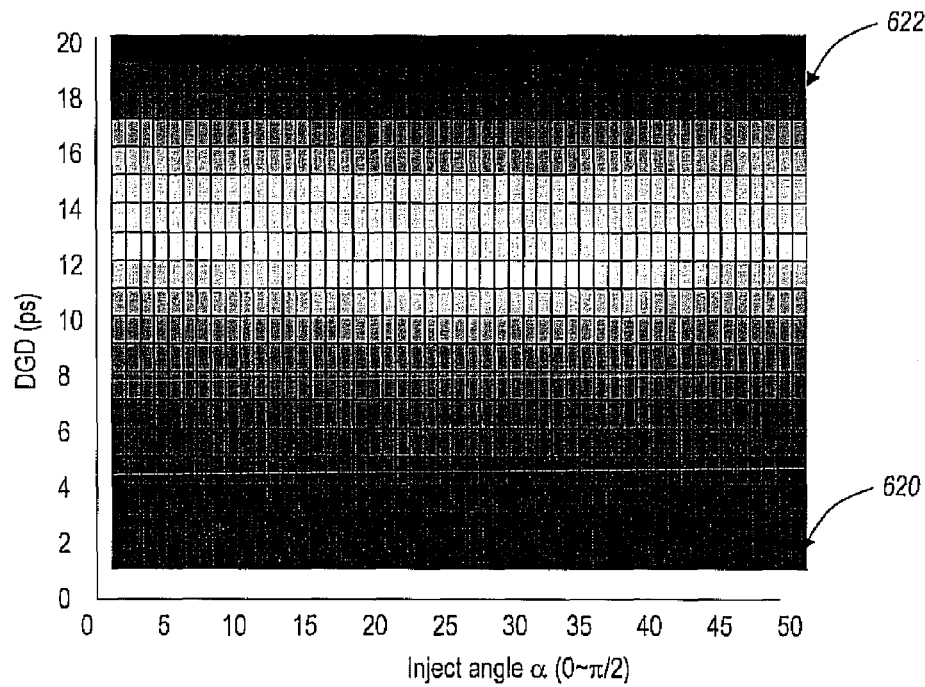
FIGS. 16 and 17 are graphs of a simulated level of a 28 GHz clock frequency for an 112 Gbits/s polarization multiplexed 33% RZ-DQPSK system with time offset of ¼ symbol period between the two polarizations according to an exemplary embodiment of the present invention.
Figure 17:
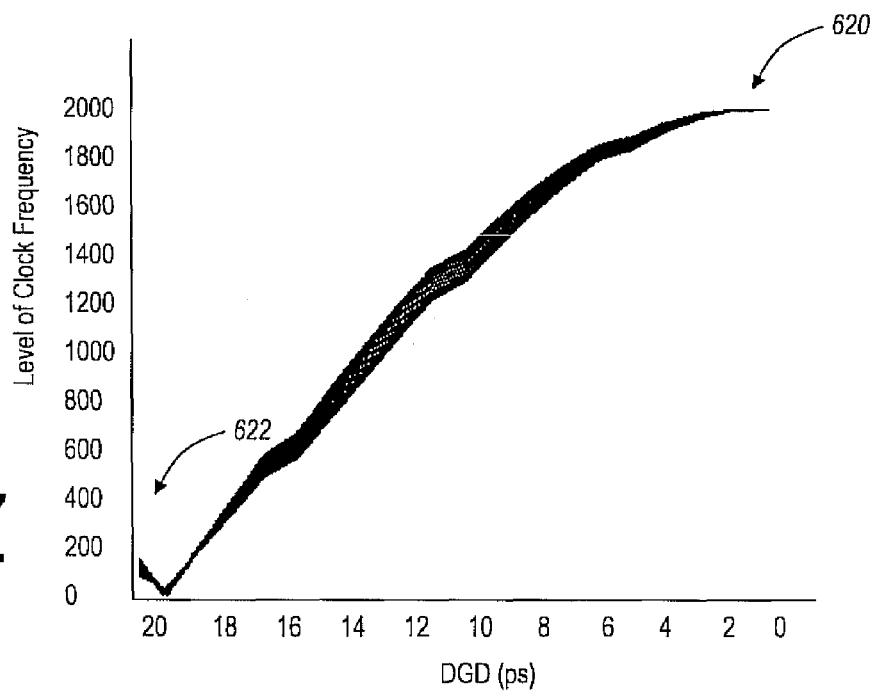

Referring to FIGS. 16 and 17, graphs show a simulated level of a 28 GHz clock frequency for an 112 Gbits/s polarization multiplexed 33% RZ-DQPSK system with time offset of ¼ symbol period between the two polarizations according to an exemplary embodiment of the present invention. The value of DGD2 504 is set to ¼ symbol period as well, which is 8.93 ps in this system. FIG. 16 is a contour graph illustrating the level of clock frequency as a function of inject angle α from 0 to π/2 on the x-axis and DGD level in picoseconds (ps) on the y-axis. Shading 620, 622 in FIG. 16 shows the level of clock frequency: the shading 620 is high and the shading 622 is low. FIG. 16 shows the level of clock frequency depends on the value of the DGD, but not on the inject angle. FIG. 17 is the three-dimensional view of FIG. 16. FIGS. 16 and 17 show the relationship between the level of frequency and the DGD value.

FIGS. 12-17 show that the PMDC 100 in the PMDC and polarization de-multiplexer 500 can work for polarization multiplexed signals 506 with arbitrary time offset between the two polarizations.

Figure 18:
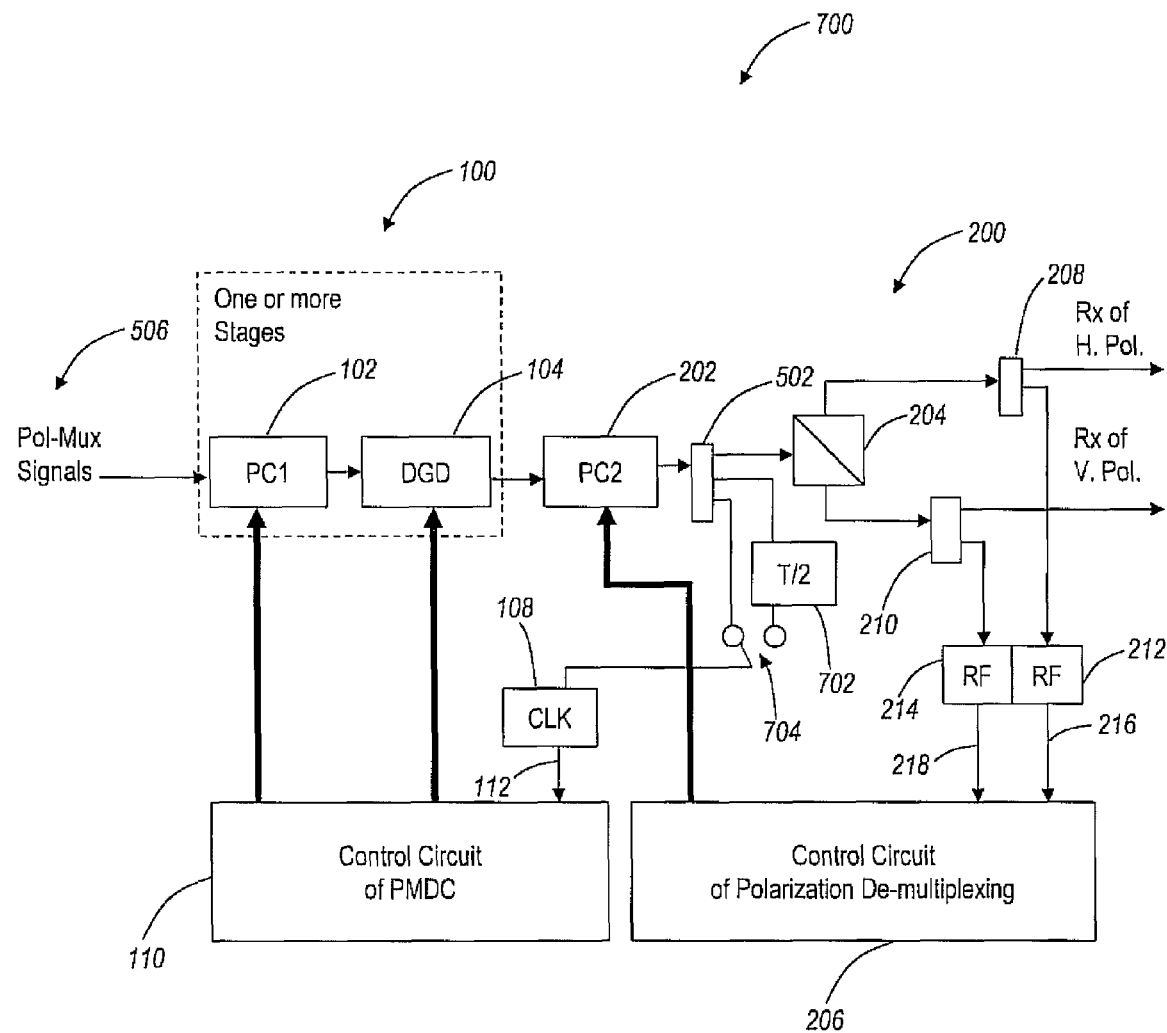
FIG. 18 is a PMDC and polarization de-multiplexer for either bit-aligned or bit-interleaved PolMux systems according to an exemplary embodiment of the present invention.

Referring to FIG. 18, a PMDC and polarization de-multiplexer 700 for either bit-aligned or bit-interleaved PolMux systems is illustrated according to an exemplary embodiment of the present invention. The PMDC and polarization de-multiplexer 700 is a slightly different from the PMDC and polarization de-multiplexer 500. Here, the DGD2 504 is replaced with an extra tap output on the tap 502, a half symbol period DGD (T/2) 702, and a 1×2 optical switch 704. The optical switch 704 can choose either optical path with zero or half symbol period delay. Advantageously, this enables the PMDC 100 to work for either bit-aligned or bit-interleaved PolMux signals. Those of ordinary skill in the art will recognize that more values of the DGD 702, more tap outputs, and the optical switch 704 with more ports can also be used to work for PolMux systems with more than two preferred time offsets between the two polarizations.

In the example of FIG. 18, the optical switch 704 includes two branches for tapped output of the tap 502: one without DGD and the other having a DGD element with a half-symbol period delay, i.e. the half symbol period DGD 702. The 1×2 optical switch 704 is used to choose one of these two branches for error signal detection. The error signal 112 could be the level of the basic clock frequency at a baud rate or at two times the baud rate at one polarization. If the error signal 112 is the level of the basic clock frequency at the baud rate, the switch 704 selects the branch without DGD for bit-aligned signals and selects the branch with half-symbol period DGD for bit-interleaved signals. On the other hand, if the error signal 112 is the level of the clock frequency at twice the baud rate, the switch 704 selects the branch with half-symbol period DGD for bit-aligned signals and selects the branch without DGD for bit-interleaved signals.

The PMDC 500 can also be simplified by replacing the DGD2 504 with a fixed DGD if the PMDC 100 only needs to work for a PolMux system with known and fixed time offset between the two polarizations. For example, the value of the fixed DGD should be zero for a bit-aligned PolMux system and T/2 for a bit-interleaved PolMux system.

All the above structures use one value of DGD to work for a PolMux system with given time offset between the two polarizations. The error signal is the clock frequency at the baud rate of the signal at one polarization. For example, the clock frequency is 28 GHz for an 112 Gbit/s PolMux RZ-DQPSK system. Based on simulation and experimentation, it was also determined that when the value of DGD is set to either zero or T/2, the error signal could also be the level of clock frequency at two times of the baud rate of the signal at one polarization. For example, the level of a 560 Hz clock frequency can be used as error signal for a bit-aligned or bit-interleaved 112 Gbit/s PolMux RZ-DQPSK system, when the value of DGD is set to either zero or T/2. This means a DGD with a value of zero or T/2 can work for both bit-aligned and bit-interleaved PolMux systems as long as the level of clock frequency at two times the baud rate of the signal at one polarization is used as error signal.

Figure 19:
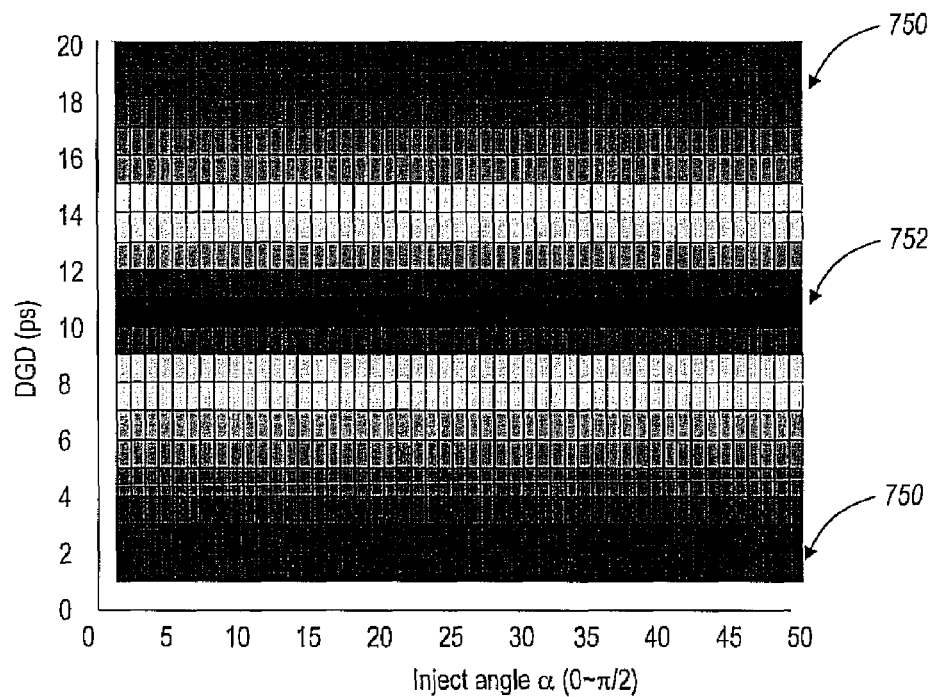
FIGS. 19 and 20 are graphs of a simulated level of a 56 GHz clock frequency for an 112 Gbits/s bit-aligned polarization multiplexed 33% RZ-DQPSK system with a DGD value of 17.86 ps according to an exemplary embodiment of the present invention.
Figure 20:
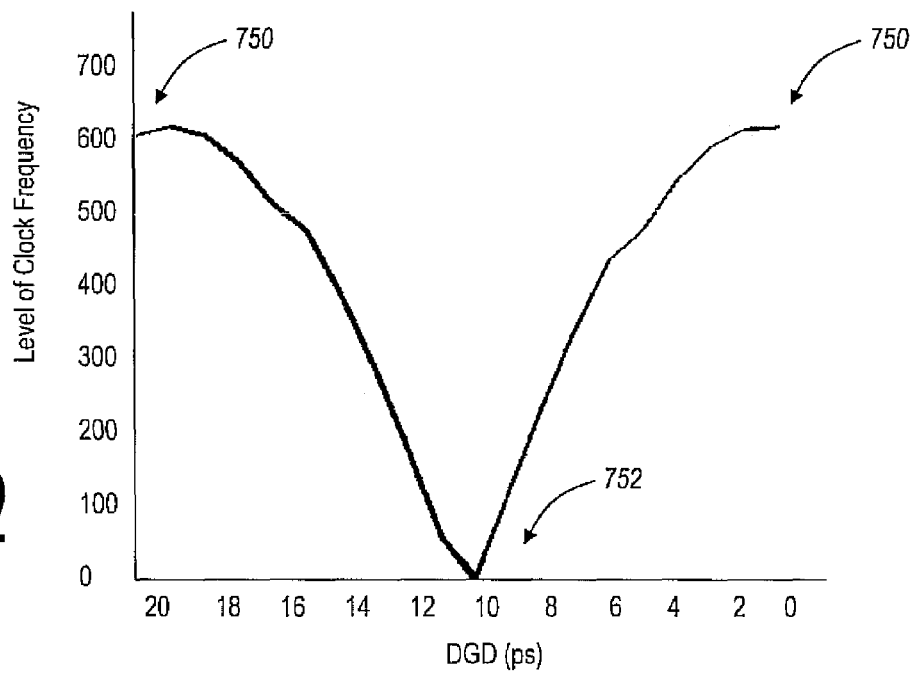

Referring to FIGS. 19 and 20, graphs show a simulated level of a 560 Hz clock frequency for an 112 Gbits/s bit-aligned polarization multiplexed 33% RZ-DQPSK system with a DGD value of 17.86 ps according to an exemplary embodiment of the present invention. FIG. 19 is a contour graph illustrating the level of clock frequency as a function of inject angle α from 0 to π/2 on the x-axis and DGD level in picoseconds (Ps) on the y-axis. Shading 750, 752 in FIG. 19 shows the level of clock frequency: the shading 750 is high and the shading 752 is low. FIG. 20 is a three-dimensional view of FIG. 19. Both FIGS. 19 and 20 show the level of clock frequency depends on the value of DGD, but just slightly on the inject angle.

Figure 21:
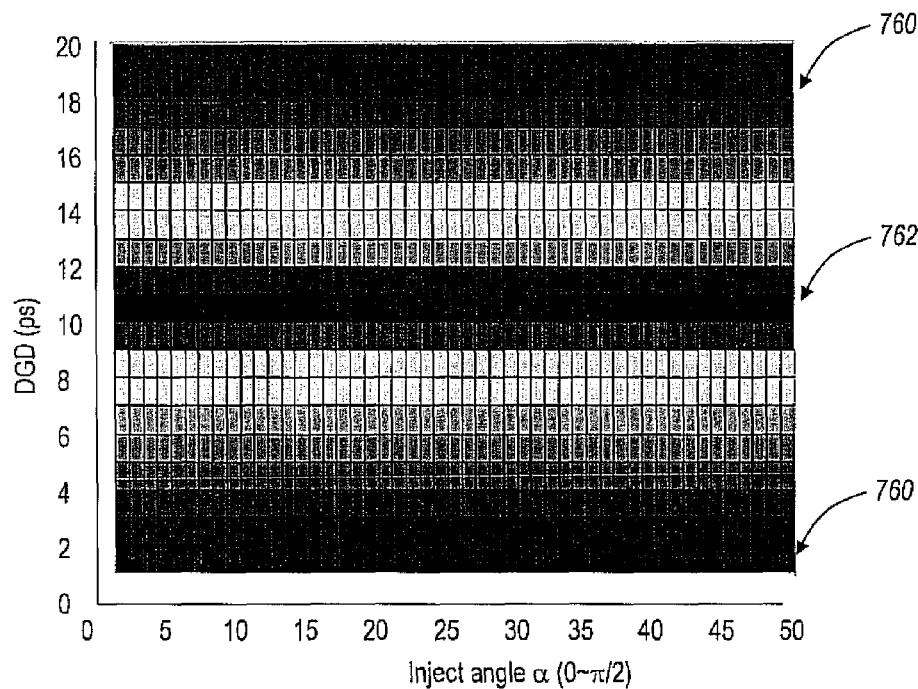
FIGS. 21 and 22 are graphs of a simulated level of a 56 GHz clock frequency for an 112 Gbits/s bit-interleaved polarization multiplexed 33% RZ-DQPSK system with a DGD value of 17.86 ps according to an exemplary embodiment of the present invention.
Figure 22:
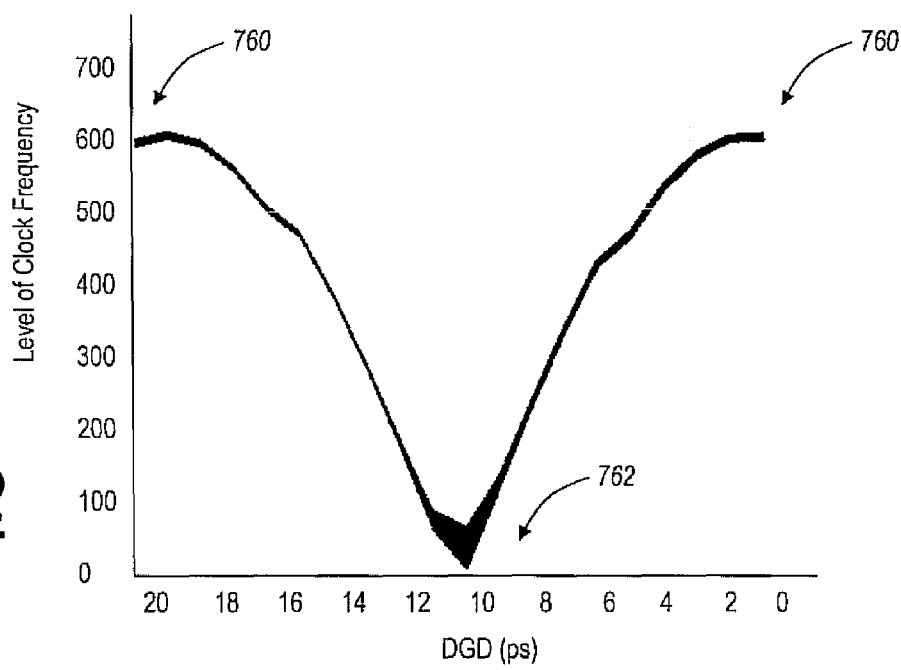

Referring to FIGS. 21 and 22, graphs show a simulated level of a 560 Hz clock frequency for an 112 Gbits/s bit-interleaved polarization multiplexed 33% RZ-DQPSK system with a DGD value of 17.86 ps according to an exemplary embodiment of the present invention. FIG. 21 is a contour graph illustrating the level of clock frequency as a function of inject angle α from 0 to π/2 on the x-axis and DGD level in picoseconds (ps) on the y-axis. Shading 760, 762 in FIG. 21 shows the level of clock frequency: the shading 760 is high and the shading 762 is low. FIG. 22 is a three-dimensional view of FIG. 21. Both FIGS. 21 and 22 show the level of clock frequency depends on the value of DGD, but just slightly on the inject angle.

FIGS. 19-22 show that the level of clock frequency at two times of the baud rate of the signal at one polarization can be used as error signal for both bit-aligned and bit-interleaved PolMux systems with a DGD value of T/2. Similar figures and results can be generated for PolMux systems with DGD value of zero (or no DGD).

The various PMDCs described herein work for PolMux signals with arbitrary time offset between the two polarizations, especially bit-aligned and bit-interleaved PolMux signals. The error signal used is the level of clock frequency at the baud rate of the signal at one polarization. The detected error signal is used to control the polarization controller and/or DGD in the PMDC only. The polarization controller for the polarization de-multiplexer is controlled by other error signals. This allows the PMDC control loop to work independently with the polarization de-multiplexer control loop. The DGD in PMDC could be tunable or fixed. If tunable, the PMDC can cancel the DGD of fiber system completely and provide better performance. If the DGD value is zero or T/2 in the error signal path, the error signal can also be the level of clock frequency at two times of the baud rate of the signal at one polarization. With this error signal, the PMDC can work for both bit-aligned and bit-interleaved PolMux systems. Because the error signal depends only on the value of DGD in the system, the PMDC can be locked in the cancellation mode. There is no switching between the cancellation mode and PSP mode for this PMDC. It solves the dynamic limitation of most current PMDC. Additionally, the present invention does not need polarization scrambling or dithering of the transmitted signals.

Figure 23:
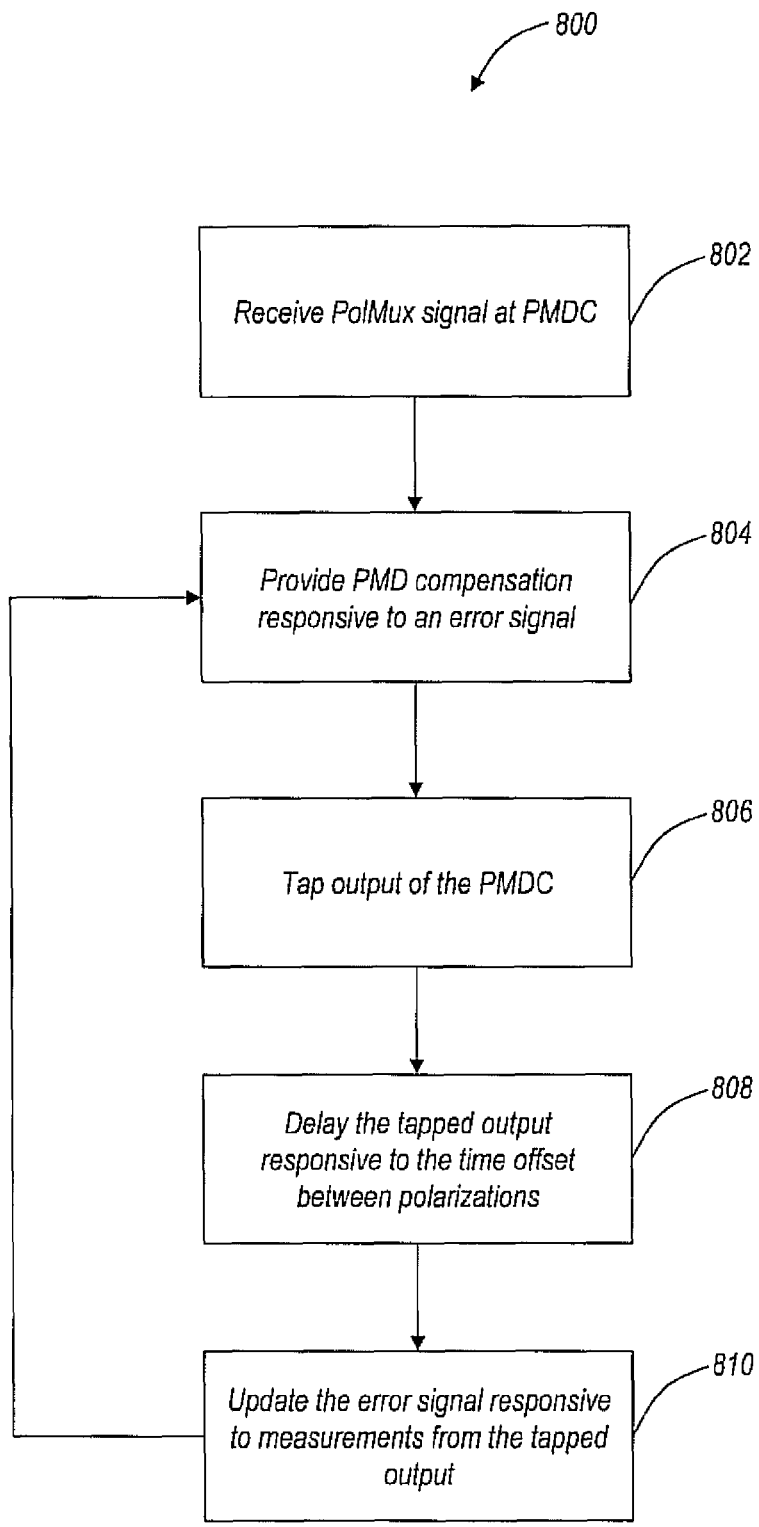
FIG. 23 is a flowchart of a PMD compensation mechanism for PolMux signals with an arbitrary time offset between polarizations according to an exemplary embodiment of the present invention.

Referring to FIG. 23, a flowchart illustrates a PMD compensation mechanism 800 for PolMux signals with arbitrary time offsets between the polarizations according to an exemplary embodiment of the present invention. The PMD compensation mechanism 800 begins by receiving a PolMux signal at a PMDC (step 802). PMD compensation is provided responsive to an error signal (step 804). The PMD compensation can include polarization controllers, DGDs, a control circuit for the polarization controllers and the DGDs, and the like. The control circuit is configured to operate the polarization controllers and the DGDs responsive to the error signal. An output of the PMDC is tapped (step 806). The tapped output is delayed responsive to the time offset between the polarizations (step 808). The error signal is updated responsive to measurements from the delayed tapped output (step 810).

As described herein, the error signal can be measured through a detector receiving the tapped output. The error signal can include the level of a basic clock frequency at the baud rate or at two or more times the baud rate for bit-aligned polarization multiplexed systems. For bit-interleaved PolMux systems, the basic clock frequency detected by the optical detector is two times of the baud rate at one polarization. Note, the delay step 808 can be utilized to shift the pulse trains of the two polarizations back to a bit-aligned status. This shift generates a clock frequency at the baud rate.

Figure 24:
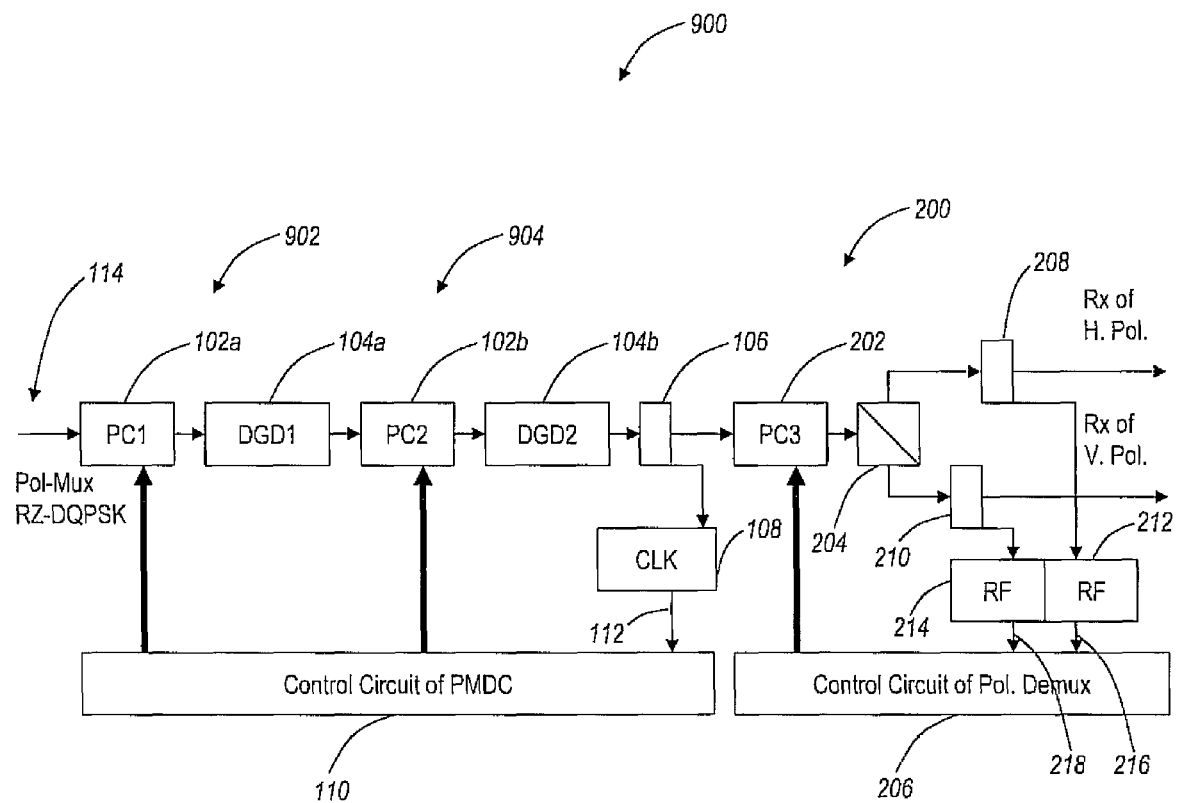
FIG. 24 is a PMDC and polarization de-multiplexer structure for PolMux systems with two PMDC stages according to an exemplary embodiment of the present invention.

Referring to FIG. 24, a PMDC structure 900 for PolMux systems is illustrated with two PMDC stages 902, 904 according to an exemplary embodiment of the present invention. As described herein, the PMDC structure 900 can operate for both bit-aligned and interleaved Pol-Mux RZ-DPSK/DQPSK systems. The first PMDC stage 902 includes a PC 102a and a DGD 104a, and the second PMDC stage 904 includes a PC 102b and a DGD 104b. A PolMux signal 114 is input into the first PMDC stage 902, and the first and second PMDC stages 902, 904 provide PMD compensation based on inputs from a control circuit 110. An output of the second PMDC stage 904 is provided to a tap 106 which splits the signal to an error detection circuit (CLK) 108. The error detection circuit (CLK) 108 provides an error signal 112 to the control circuit 110. The tap 106 also connects to a PC 202 which is part of a polarization de-multiplexer 200. The polarization de-multiplexer 200 is described in FIG. 2.

The PMDC structure 900 includes two separate control loops: a PMDC loop and a polarization de-multiplexing (Pol-Demux) loop, with their own error signals (i.e. error signals 112, 216, 218) and control algorithms. The PMDC loop includes the polarization controllers and DGD components (PCs 102a, 102b and DGDs 104a, 104b), the optical tap 106, an error detection circuit for the clock frequency (i.e., clock circuit 108) and the control circuit 110. A two-stage PMDC is shown in FIG. 24, but those of ordinary skill in the art will recognize that a one- or more-stage PMDC can also be used.

After the PMDC loop (i.e., first and second PMDC stages 902, 904), there is a Pol-Demux loop (i.e., polarization de-multiplexer 200) which tracks and splits the two orthogonal polarizations. The polarization de-multiplexer 200 includes a PC 202, a polarization splitter 204, optical taps 208, 210, error detection circuits for the level of radio frequency (RF) signals 214, 216, and a control circuit 206. The RF power is generated by the beating between signals at the two polarizations. RF signals are detected on both outputs of the polarization splitter 204 in order to minimize the impact of PDL. In both loops, the control circuits 110, 206 detect their error signals and control the polarization controllers 102a, 102b, 202 to optimize the error signals 112, 216, 218. Since the two control loops do not share components or error signals 112, 216, 218, they work independently, which provides robust and flexible controlling. The control speed of the PMDC loop needs to be slower than that of the Pol-Demux loop in order for the latter to work stably.

Figure 25:
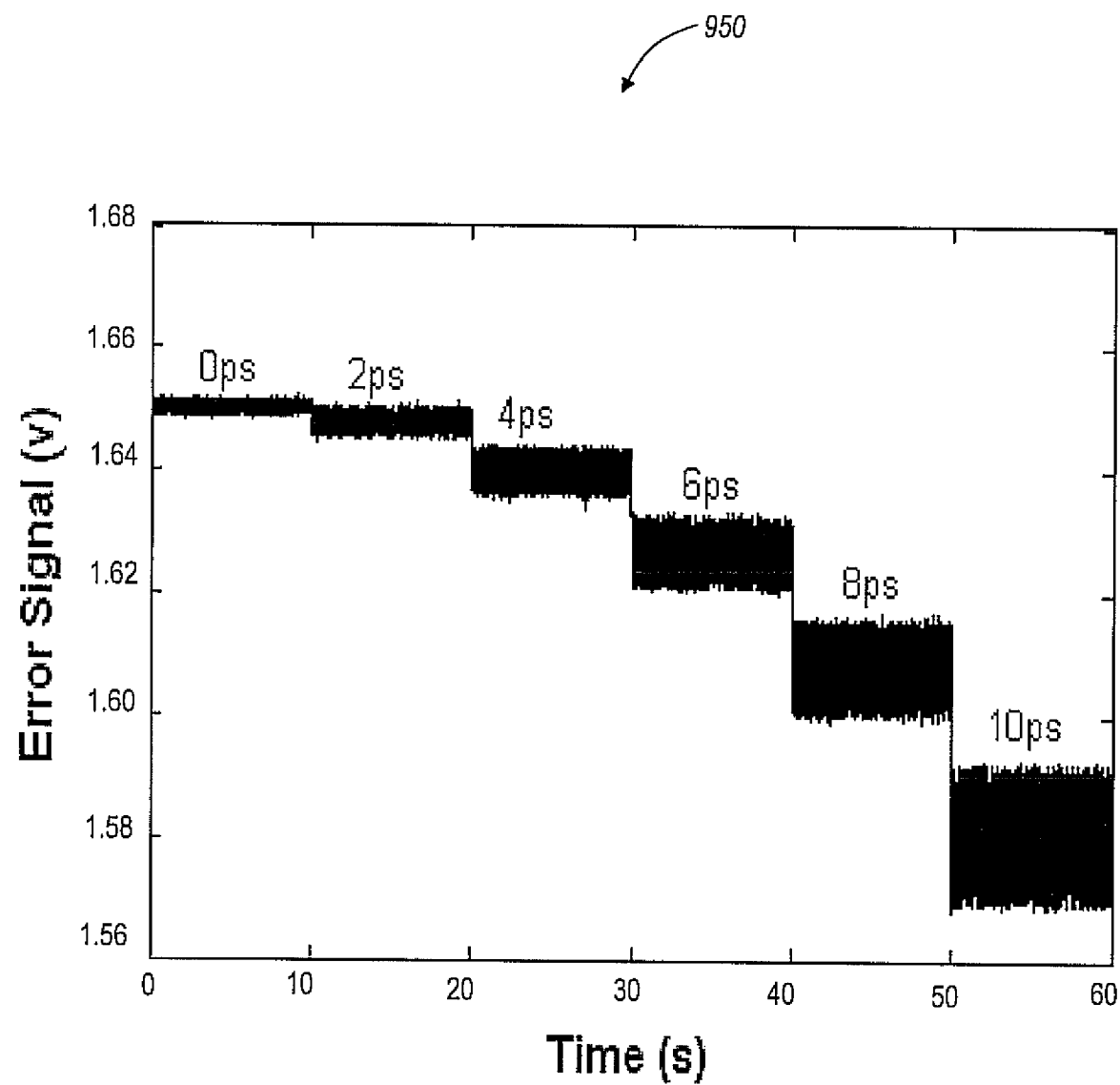
FIG. 25 is a graph showing the measured error signal at different DGD levels with the polarization scrambling of the input signals according to an exemplary embodiment of the present invention.
Figure 26:
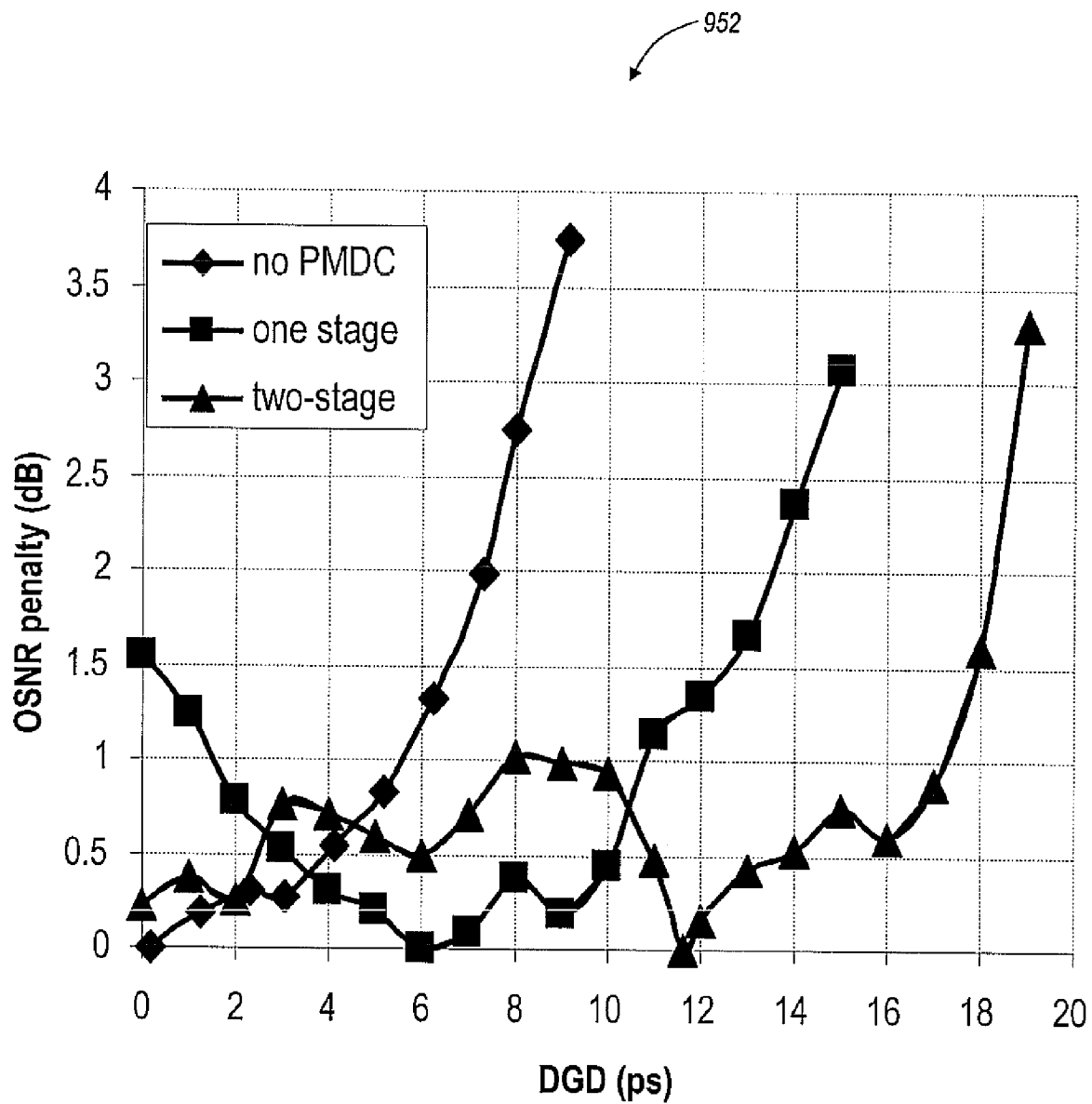
FIG. 26 is a graph showing the measured OSNR penalties for various implementations including no PMD compensation, a one-stage PMDC according to an exemplary embodiment of the present invention, and a two-stage PMDC according to an exemplary embodiment of the present invention.
Figure 27:
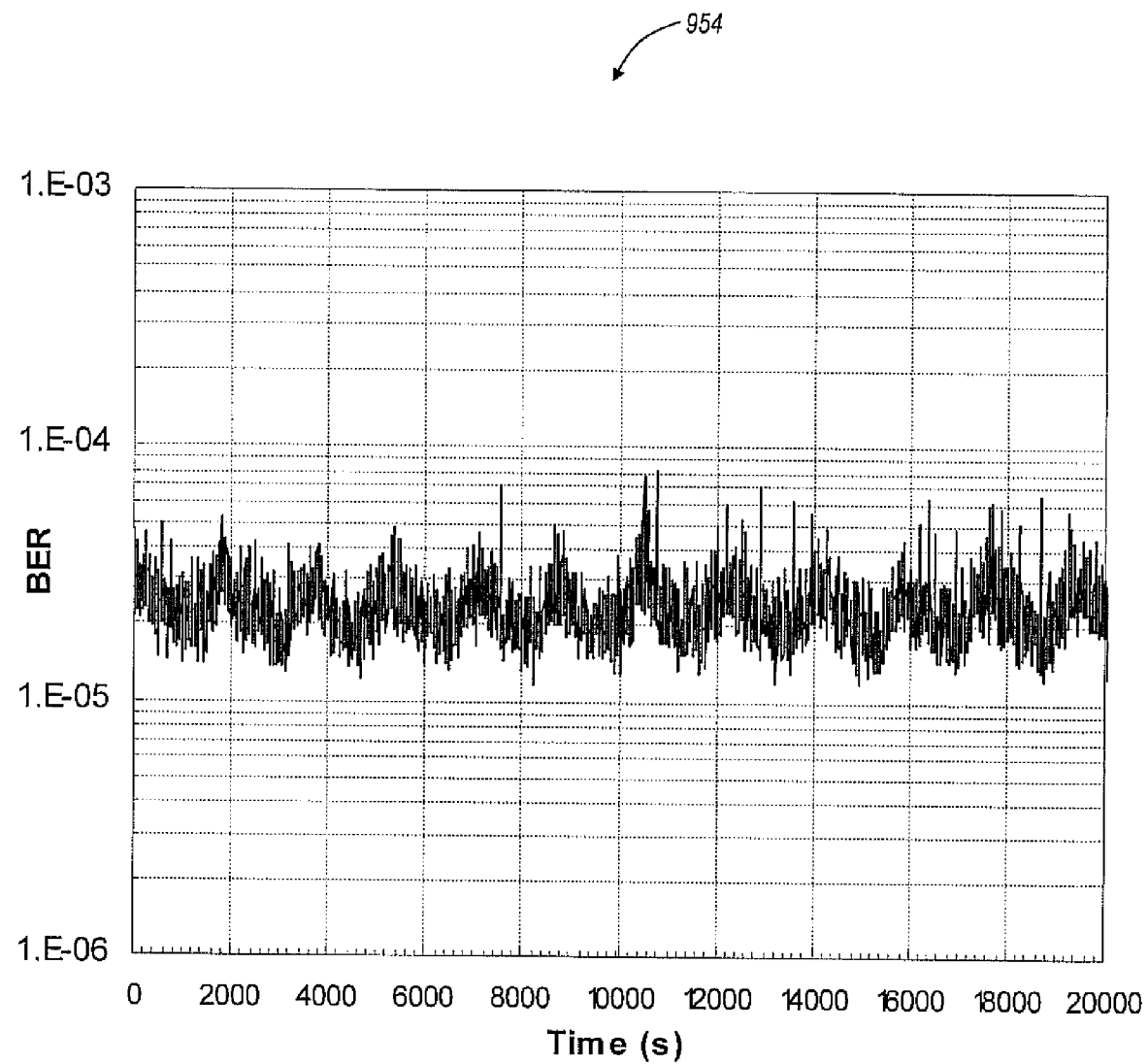
FIG. 27 is a graph showing results from a 5.5-hour BER soak for a two-stage PMDC with 11.6 ps system DGD according to an exemplary embodiment of the present invention.

Referring to FIGS. 25-27, various graphs 950, 952, 954 illustrate exemplary operations of the PMDC structure of the present invention in a 112 Gb/s bit-aligned Pol-Mux RZ-DQPSK system according to an exemplary embodiment of the present invention. For these exemplary operations, the polarization controllers include six-stage $LiNbO_3$ devices and the control algorithm used is a dithering method which finds the optimal next step from three dithering steps (present, up and down). The error detection circuit (CLK) 108 in the PMDC loop detects the level of 28 GHz clock signal and the control circuit 110 controls the two polarization controllers to maximize the clock level.

In the exemplary operations, a first-order PMD emulator surrounded by two polarization scramblers is placed after a transmitter to simulate system DGD. The PMD emulator is followed by the PMDC of the present invention. ASE (amplified stimulated emission) noise is injected to adjust the optical signal-to-noise ratio (OSNR) level. The detection circuit 212, 214 in the Pol-Demux loop detects the total RF power from 1 MHz to 8 GHz from a PIN detector.

FIG. 25 is a graph 950 showing the measured error signal 112 at different DGD levels with the polarization scrambling of the input signals. Here, the level of 28 GHz clock signal is measured at different DGD levels to confirm the sensitivity of the error signal 112. From the graph 950, it can be seen that the variation caused by polarization scrambling is less than that caused by DGD change. Accordingly, the graph 950 shows the error signal 112 is a good indicator of the DGD level.

FIG. 26 is a graph 952 showing the measured OSNR penalties for no PMD compensation, a one-stage PMDC according to the present invention, and a two-stage PMDC according to the present invention. OSNR penalties are measured by finding the OSNR levels required to achieve a BER (bit error rate) of $3 \times 10^{-5}$ at different system DGD levels. The graph 952 shows that the DGD tolerance for 1.5 dB OSNR penalty is about 6 ps with no compensation. With a one-stage PMDC and using a 6.2 ps DGD element, the DGD tolerance is increased to 12 ps. The penalty curve is almost symmetric around 6 ps DGD and the DGD tolerance is double that with no PMDC. With a two-stage PMDC and DGD elements having 5.7 ps and 5.9 ps of DGD, the DGD tolerance is increased to about 18 ps. The penalty curve has two minimum points: 0ps when the PMD vectors of the two DGD elements are in opposite directions and 11.6 ps when the PMD vectors of the DGD elements are aligned. The penalty is higher in between because of the impact of second order PMD.

FIG. 27 is a graph 964 showing results from a 5.5-hour BER soak for the two-stage PMDC with 11.6 ps system DGD. Accordingly, FIG. 27 shows that both the PMDC and Pol-Demux of the present invention work fine over an extended period of time.

The control speed of the PMDC depends on the hardware speed of the control circuits 110, 206. In an exemplary operation, approximately 2 rad/s tracking and compensation on the Poincare Sphere was demonstrated with a computer-based control circuit. It is expected to be several orders of magnitude times faster if high speed field programmable gate array (FPGA) control circuits are used.

Figure 28:
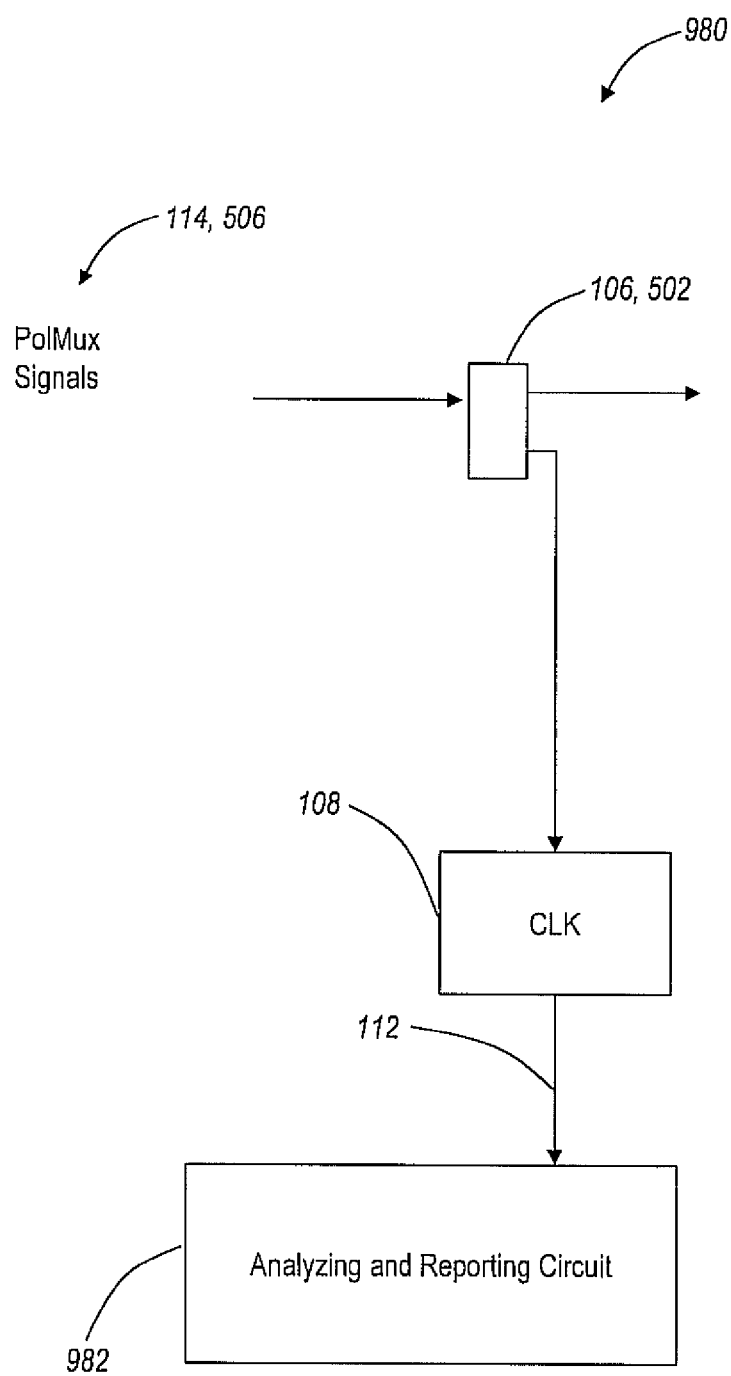
FIG. 28 is a block diagram PMD monitoring or measurement equipment 980 to indicate the amount of DGD in PolMux systems according to an exemplary embodiment of the present invention.

Referring to FIG. 28, because the level of proposed error signal is correlated with the amount of DGD in the system, the error signals 112 can be used in PMD monitoring or measurement equipment 980 to indicate the amount of DGD in Pol-Mux systems according to an exemplary embodiment of the present invention. In such an application, a polarization multiplexed RZ DmPSK signal 114, 506, either existing in the given system or generated by the monitoring or measurement equipment, is used as a signal source. A detecting circuit, such as the error detection circuit (CLK) 108, detects the level of the error signal 112 from an optical tap 106, 502. An analyzing circuit 982 compares this level with the pre-calibrated data and reports the amount of DGD in the system. The error signal 112 includes one of a level of a basic clock frequency at a baud rate or at two or more times the baud rate at one polarization for bit-aligned polarization multiplexed systems and a level of a basic clock frequency at a two times the baud rate at one polarization for bit-interleaved polarization multiplexed systems.

Figure 29:
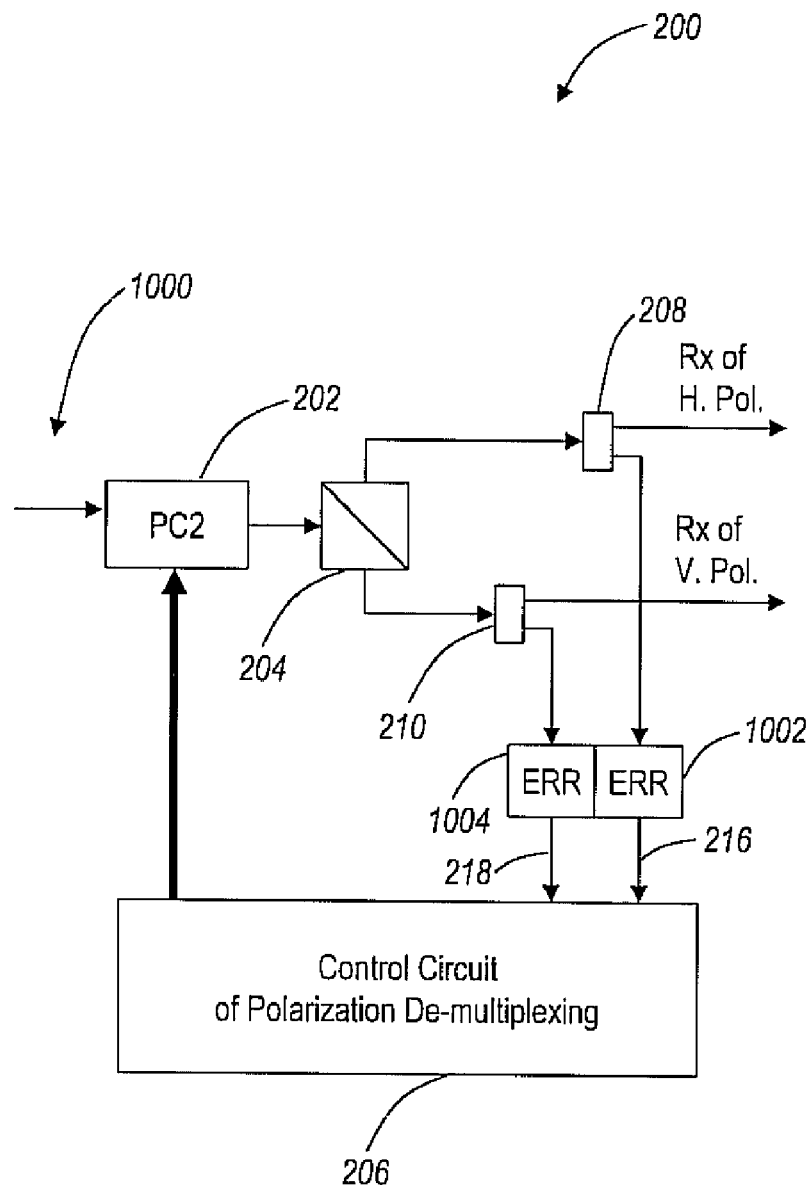
FIG. 29 is a block diagram of a polarization de-multiplexer 200 that can be utilized to track and split the two orthogonal polarizations while mitigating PDL according to an exemplary embodiment of the present invention.

Referring to FIG. 29, the polarization de-multiplexer 200 can be utilized to track and split the two orthogonal polarizations while mitigating PDL impact according to an exemplary embodiment of the present invention. As described herein, the polarization de-multiplexer 200 includes the polarization controller (PC2) 202, the polarization splitter 204, and the control circuit 206. The PC 202 is input with a PolMux signal 1000. The PolMux system 1000 can be an output from one of the PMDCs described herein or from another source. The polarization controller (PC2) 202 is used to track and align the two orthogonal polarizations to the horizontal and vertical polarizations, which are then split by the polarization splitter 204. Outputs of the polarization splitter 204 (i.e., horizontal and vertical polarizations) are provided to the separate taps 208, 210. The taps 208, 210 provide an output to receivers (not shown) for each of the horizontal and vertical polarizations and to error detectors 1002, 1004. The error detectors 1002, 1004 can include the RF detectors 212, 214 in FIG. 2. However, the error detectors 1002, 1004 do not have to be the same as the detectors 212, 214. The error detectors 1002, 1004 can be generalized to any kind of error detectors.

The polarization de-multiplexer 200 can mitigate impacts of PDL through the error detectors 1002, 1004 at both output arms of the polarization splitter 204. The error detectors 1002, 1004 each provide an error detection circuit. In the present invention, error signals 216, 218 can be detected at both arms of the polarization splitter. The error signal 216, 218 could be the low frequency RF power generated by the beating between signals at the horizontal and vertical polarizations. The control circuit 206 reads error signals 216, 218 from both arms, analyzes and processes them, and then controls the polarization controller 202 to minimize the error signals 216, 218 or maximize the signal performance.

There may or may not be an optical PMDC in front of the polarization de-multiplexer 200. If there is a PMDC, the polarization de-multiplexer is more tolerable to the PMD penalty. The polarization multiplexed signals 1000 can be at any modulation format, such as on-off keying (OOK), differential phase shift keying (DPSK), or other formats. Their pulses can be either return-to-zero (RZ) or non-return-to-zero (NRZ). The error signals 216, 218 can be any kinds of error signal, as long as they can reflect the alignment between the signal SOP and polarization directions of the polarization splitter 204 for the given polarization multiplexed signal format. For example, if the polarization multiplexed signals are in the RZ-DPSK format, the error signal could be the power of low frequency radio frequency (RF) signal generated by the beating between the signals at the two polarizations. If the signal SOPs are not aligned with the required polarization direction of the polarization splitter 204, the power of both signals comes out of each arm of the polarization splitter 204. The two signals beat with each other to generate a RF signal if direct detected by an optical detector. The closer the polarization alignment is, the lower the level of the RF beating signal. The control circuit 206 can control the polarization controller 202 to minimize the level of the RF beating signal in order to align the signal SOPs and the polarization splitter 202.

Figure 30A:
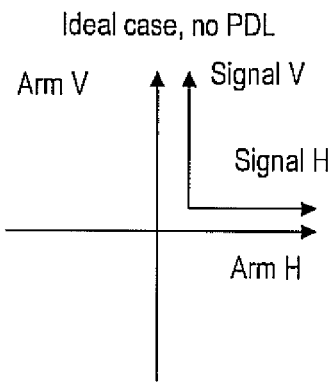
FIGS. 30a through 30d are graphs of the SOPs of both vertical and horizontal signals according to an exemplary embodiment of the present invention.
Figures 30B, 30C:
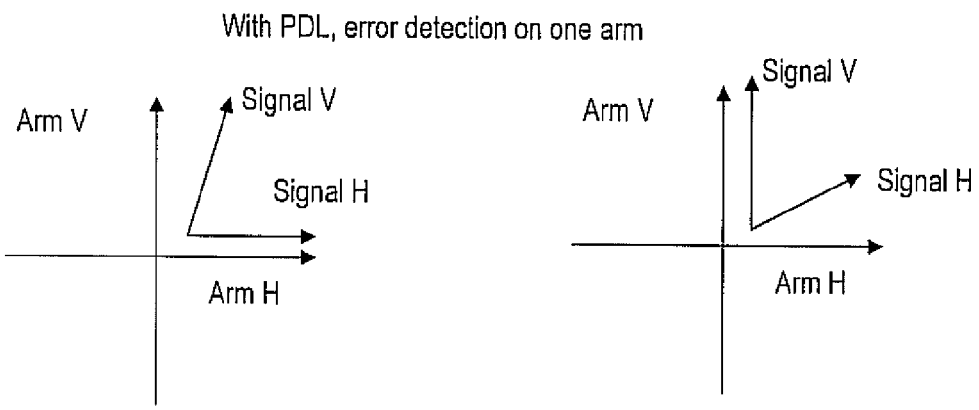
Figure 30D:
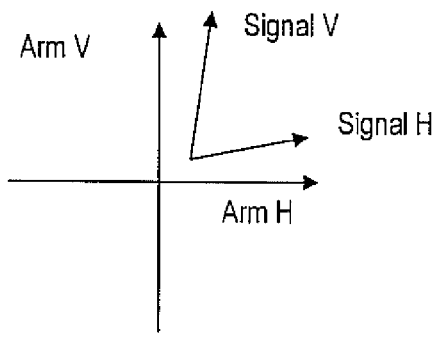

Referring to FIGS. 30a through 30d, graphs illustrate the SOPs of both vertical and horizontal signals according to an exemplary embodiment of the present invention. In FIG. 30a, the SOPs of both signals can be aligned to the polarization directions of the arms of the polarization splitter 202 when there is no PDL in the system. When there is PDL in the system as shown in FIGS. 30b-30d, however, the SOPs of the two signals are no longer orthogonal. If only one error detection circuit is installed at one output arm of the polarization splitter 204, the polarization de-multiplexer 200 aligns the SOP of one signal to its desired arm of the polarization splitter, while leave the other signal misaligned, as shown in FIGS. 30b and 30c. Here, one signal has little beating noise while the other has much higher beating noise. Accordingly, the latter signal has a much higher penalty. If two error detection circuits 1002, 1004 are installed at both output arms of the polarization splitter 204, as shown in FIG. 29, the two detected error signals 216, 218 can be analyzed and processed in the control circuit 206, and generate a final error signal that is minimized by the polarization controller. This scheme compromises the PDL penalties on both signals, as shown in FIG. 30d.

The following two equations represent the power received at the error detection circuits 1002, 1004:

$$RF\_h \propto 2 \cdot E\_h \cdot E\_v \cdot \cos(\alpha\_h) \cdot \sin(\alpha\_v)$$

$$RF\_v \propto 2 \cdot E\_h \cdot E\_v \cdot \cos(\alpha\_v) \cdot \sin(\alpha\_h)$$

where RF_h and RF_v are the RF beating signals at the H and V arms of polarization splitter 204, E_h and E_v are the amplitude of the electrical field of the signal H and V, α_h is the angle between signal H and arm H, and α_v is the angle between signal V and arm V, respectively. The sum of α_h and α_v is a constant angle, which represents the difference of the angle between the two signal SOPs and 90 degrees. Both RF_h and RF_v need to be minimized to reduce the PDL penalty on the two signals. The control circuit 206 reads RF_h and RF_v, controls the polarization controller 202 to balance α_h and α_v in order to balance the PDL penalties on the two signals. Accordingly, the two signals have similar PDL penalties, which is smaller than the high PDL penalty in the one error detection case.

One exemplary mechanism to process the two RF beating signals at the power detectors 1002, 1004 is to find the maximum of the these two RF signals and set it as the final error signal that is minimized by controlling the polarization controller. In this way, α_h and α_v are optimized to equal to each other, and the two RF signals are also the same. The present invention further contemplates more complicated mechanisms that could take into account the power difference of the two signals. The signal with higher power has higher OSNR and better performance. So it can tolerate more beating noise caused by PDL. In the optimum case, α_h is larger than α_v if E_h is lower than E_v, and vise versa. The accurate balance depends on many factors such as the difference between E_h and E_V, the sum of α_h and α_h, the OSNR levels of the signals, and the receiver performances. Besides the RF beating signals, other kinds of error signals, such as the optical power at the two arms, may be needed as well in order to optimize the balance.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A polarization mode dispersion compensator for polarization multiplexed Return-to-Zero signals, comprising:
   a polarization control mechanism;
   a tap located after the polarization control mechanism and before a polarization splitter;
   an error detection circuit connected to the tap; and
   a control circuit configured to control the polarization control mechanism responsive to an error signal from the error detection circuit;
      wherein the error signal comprises one of a level of a basic clock frequency at a baud rate or at two or more times the baud rate at one polarization for bit-aligned polarization multiplexed systems and a level of a basic clock frequency at a two times the baud rate at one polarization for bit-interleaved polarization multiplexed systems; and
      wherein the error detection circuit is configured to detect the error signal.

2. The polarization mode dispersion compensator of claim 1, further comprising a polarization de-multiplexer comprising the polarization splitter.

3. The polarization mode dispersion compensator of claim 2, wherein polarization de-multiplexer comprises a separate error signal for polarization control of the polarization de-multiplexer;
   wherein the separate error signal comprises error signals at both output arms of the polarization splitter; and
   wherein the polarization de-multiplexer further comprising a polarization de-multiplexer control circuit receiving the error signals at both output arms of the polarization splitter, wherein the polarization de-multiplexer control circuit is configured to control a polarization de-multiplexer polarization control mechanism to mitigate polarization dependent loss.

4. The polarization mode dispersion compensator of claim 1, wherein the polarization control mechanism comprises:
   one or more polarization controllers; and
   one or more differential group delays, wherein each of the one or more differential group delays comprise one of a fixed and tunable differential group delay;
   wherein each of the one or more polarization controllers and the one or more differential group delays are controlled by the control circuit.

5. The polarization mode dispersion compensator of claim 1, wherein the polarization mode dispersion compensator is locked in a cancellation mode.

6. The polarization mode dispersion compensator of claim 1, wherein an input Return-to-Zero differential m-phase shift keying polarization multiplexed signal comprises no polarization scrambling or dithering.

7. The polarization mode dispersion compensator of claim 1, further comprising:
   an optical switch coupled to two outputs of the tap, wherein one of the two outputs comprises a half-symbol period delay;
   wherein if the error signal is the level of the basic clock frequency at the baud rate, the switch selects the output without the half-symbol period delay for bit-aligned signals and selects the output with the half-symbol period delay for bit-interleaved signals; and
   wherein if the error signal is the level of the clock frequency at twice the baud rate, the switch selects the output with the half-symbol period delay for bit-aligned signals and selects the output without half-symbol period delay for bit-interleaved signals.

8. A polarization mode dispersion compensator for polarization multiplexed Return-to-Zero differential m-phase shift keying signals with arbitrary time offsets between polarizations, comprising:
   a polarization control mechanism;
   a tap located after the polarization control mechanism;
   a delay mechanism connected to the tap, wherein the delay mechanism is configured to compensate for the arbitrary time offsets between polarizations;
   an error detection circuit connected to the delay mechanism; and
   a control circuit configured to control the polarization control mechanism responsive to an error signal from the error detection circuit signal;
      wherein the error signal comprises the level of the basic clock frequency at the baud rate at one polarization; and
      wherein the error detection circuit is configured to detect the error signal.

9. The polarization mode dispersion compensator of claim 8, further comprising a polarization de-multiplexer comprising a polarization splitter, wherein the tap is located before the polarization splitter.

10. The polarization mode dispersion compensator of claim 9, wherein polarization de-multiplexer comprises a separate error signal for polarization control of the polarization de-multiplexer;
   wherein the separate error signal comprises error signals at both output arms of the polarization splitter; and wherein the polarization de-multiplexer further comprising a polarization de-multiplexer control circuit receiving the error signals at both output arms of the polarization splitter, wherein the polarization de-multiplexer control circuit is configured to control a polarization de-multiplexer polarization control mechanism to mitigate polarization dependent loss.

11. The polarization mode dispersion compensator of claim 8, wherein the polarization control mechanism comprises:
   one or more polarization controllers; and
   one or more differential group delays, wherein each of the one or more differential group delays comprise one of a fixed and tunable differential group delay;
   wherein each of the one or more polarization controllers and the one or more differential group delays are controlled by the control circuit.

12. The polarization mode dispersion compensator of claim 8, wherein the polarization mode dispersion compensator is locked in a cancellation mode.

13. The polarization mode dispersion compensator of claim 8, wherein an input polarization multiplexed Return-to-Zero differential m-phase shift keying signal comprises no polarization scrambling or dithering.

14. A polarization mode dispersion compensator for polarization multiplexed Return-to-Zero differential m-phase shift keying signals with arbitrary time offsets between polarizations, comprising:
   a polarization control mechanism;
   a tap located after the polarization control mechanism;
   a delay mechanism connected to the tap, wherein the delay mechanism is configured to compensate for the arbitrary time offsets between polarizations;
   an error detection circuit connected to the delay mechanism; and
   a control circuit configured to control the polarization control mechanism responsive to an error signal from the error detection circuit;
   wherein the delay mechanism is configured to align the polarizations to a bit-aligned system; and
   wherein the error signal comprises the level of the basic clock frequency at the baud rate at one polarization.

15. A method of analyzing and compensating polarization mode dispersion for polarization multiplexed Return-to-Zero differential m-phase shift keying signals, comprising:
   receiving a polarization multiplexed Return-to-Zero differential m-phase shift keying signal;
   tapping an output of the polarization mode dispersion compensation; and
   generating an error signal responsive to the tapped output; and
   providing polarization mode dispersion compensation responsive to the error signal; and
   wherein the error signal comprises one of a level of a basic clock frequency at a baud rate or at two or more times the baud rate at one polarization for bit-aligned polarization multiplexed systems and a level of a basic clock frequency at a two times the baud rate at one polarization for bit-interleaved polarization multiplexed systems;
   wherein the error signal is utilized only for providing polarization mode dispersion compensation; and
   wherein the polarization mode dispersion compensation is locked in a cancellation mode.

16. The method of claim 15, further comprising:
   delaying the tapped output responsive to a time offset between polarizations to form a bit-aligned system.

* * * * *